(12) United States Patent
Hillard

(10) Patent No.: US 12,156,630 B2
(45) Date of Patent: *Dec. 3, 2024

(54) MONOLITHIC DUST SEPARATOR

(71) Applicant: Mullet Tools, LLC, Dripping Springs, TX (US)

(72) Inventor: Jacob Lee Hillard, Plainville, KS (US)

(73) Assignee: Mullet Tools, LLC, Dripping Springs, TX (US)

( * ) Notice: Subject to any disclaimer, the term of this patent is extended or adjusted under 35 U.S.C. 154(b) by 84 days.

This patent is subject to a terminal disclaimer.

(21) Appl. No.: 17/327,697

(22) Filed: May 22, 2021

(65) Prior Publication Data

US 2022/0061615 A1 Mar. 3, 2022

Related U.S. Application Data

(63) Continuation-in-part of application No. 17/069,307, filed on Oct. 13, 2020, now Pat. No. 11,440,029.

(Continued)

(51) Int. Cl.
*A47L 9/16* (2006.01)
*A47L 9/19* (2006.01)

(52) U.S. Cl.
CPC ........... *A47L 9/1683* (2013.01); *A47L 9/1608* (2013.01); *A47L 9/165* (2013.01); *A47L 9/1658* (2013.01); *A47L 9/19* (2013.01)

(58) Field of Classification Search
CPC ...... A47L 9/1683; A47L 9/1608; A47L 9/165; A47L 9/1658; A47L 9/19; B04C 2003/006; B04C 3/00; B01D 45/18; B01D 45/12

See application file for complete search history.

(56) References Cited

U.S. PATENT DOCUMENTS 2,786,547 A 3/1957 McCartney
3,763,572 A * 10/1973 Titus ...................... B04B 11/00
34/79

(Continued)

FOREIGN PATENT DOCUMENTS

CA 2906452 A1 3/2016
CN 1986074 A 6/2007

(Continued)

OTHER PUBLICATIONS

Dewalt Dust Cyclone Collector (online), (dated: Nov. 10, 2023) Retrieved from Internet (Jan. 9, 2024), URL: https://www.amazon.comdp/B096N3TZLX (6 pages) (Year: 2023).

(Continued)

*Primary Examiner* — Dung H Bui
(74) *Attorney, Agent, or Firm* — Banner & Witcoff, Ltd.

(57) ABSTRACT

Dust separation devices are disclosed to enable separating and collecting dust particles. The devices include a vacuum port and a cyclone chamber that are connected by a tube between the vacuum port and an upper end of the cyclone chamber. On the cyclone chamber there is an input port for connecting to a hose for ingesting the dust particles. The devices also include a dust receptacle having a top upper surface and a port cover on a port formed in the upper surface for emptying the receptacle of collected dust particles and a lower portion of the dust receptacle that is integrally formed into the upper surface of the dust receptacle.

18 Claims, 22 Drawing Sheets

Related U.S. Application Data

(60) Provisional application No. 63/106,937, filed on Oct. 29, 2020, provisional application No. 63/070,861, filed on Aug. 27, 2020.

(56) References Cited

U.S. PATENT DOCUMENTS

| | | | |
|---|---|---|---|
| 3,771,294 A * | 11/1973 | Ronning | B65G 53/60 |
| | | | 55/460 |
| 3,953,184 A | 4/1976 | Stockford et al. | |
| 4,201,256 A * | 5/1980 | Truhan | B01D 45/12 |
| | | | 144/252.2 |
| 4,344,538 A | 8/1982 | Fujisawa et al. | |
| 5,525,396 A * | 6/1996 | Rudolph | A47L 9/1658 |
| | | | 55/342 |
| 5,528,794 A | 6/1996 | Tomasiak | |
| 5,746,795 A | 5/1998 | Witter | |
| D438,353 S | 2/2001 | Hoshino et al. | |
| D470,280 S | 2/2003 | Griffin et al. | |
| D479,371 S | 9/2003 | Griffin et al. | |
| D492,823 S | 7/2004 | Hoshino et al. | |
| 6,833,016 B2 | 12/2004 | Witter | |
| D519,251 S | 4/2006 | Hoshino et al. | |
| 7,247,180 B1 * | 7/2007 | Hill | A47L 9/0081 |
| | | | 55/315 |
| 7,282,074 B1 | 10/2007 | Witter | |
| RE40,048 E * | 2/2008 | Witter | B04C 5/04 |
| | | | 55/346 |
| 7,550,021 B2 | 6/2009 | Witter | |
| D604,464 S | 11/2009 | Witter | |
| 7,655,058 B2 * | 2/2010 | Smith | B04C 5/24 |
| | | | 55/346 |
| 7,824,457 B2 | 11/2010 | Witter | |
| 7,828,881 B2 | 11/2010 | Barnwell | |
| D632,443 S | 2/2011 | Witter | |
| D632,854 S | 2/2011 | Witter | |
| D638,179 S | 5/2011 | Witter | |
| 7,937,803 B2 | 5/2011 | Witter | |
| 8,161,597 B2 | 4/2012 | Witter et al. | |
| 8,209,815 B2 | 7/2012 | Makarov et al. | |
| 8,377,160 B2 | 2/2013 | Witter | |
| 8,393,050 B2 | 3/2013 | Witter | |
| 8,491,685 B2 | 7/2013 | Witter et al. | |
| 8,491,686 B2 | 7/2013 | Witter et al. | |
| 8,496,719 B2 | 7/2013 | Witter | |
| 8,514,090 B2 | 8/2013 | Witter et al. | |
| D690,064 S | 9/2013 | Witter et al. | |
| D703,401 S | 4/2014 | Hill | |
| 9,125,535 B2 | 9/2015 | Witter et al. | |
| 9,370,740 B2 | 6/2016 | Hill et al. | |
| 9,399,184 B2 | 7/2016 | Witter et al. | |
| D789,634 S | 6/2017 | Witter et al. | |
| 9,782,048 B2 | 10/2017 | Witter et al. | |
| D804,116 S | 11/2017 | Cheng | |
| 10,226,724 B2 | 3/2019 | Hallgren et al. | |
| 10,603,754 B2 | 3/2020 | Witter et al. | |
| D916,403 S | 4/2021 | Qiu | |
| D916,404 S | 4/2021 | Qiu | |
| D917,807 S | 4/2021 | Tian | |
| 11,358,156 B1 | 6/2022 | Tucker et al. | |
| 11,440,029 B2 | 9/2022 | Hillard | |
| 2004/0187449 A1 | 9/2004 | Witter | |
| 2005/0251951 A1 * | 11/2005 | Oh | A47L 9/165 |
| | | | 15/353 |
| 2005/0257507 A1 * | 11/2005 | Tsai | B01D 45/18 |
| | | | 55/428 |
| 2006/0277714 A1 * | 12/2006 | Dunning | B02C 18/14 |
| | | | 15/340.2 |
| 2007/0022564 A1 * | 2/2007 | Witter | A47L 9/14 |
| | | | 15/353 |
| 2007/0199284 A1 * | 8/2007 | Yoo | B04C 5/04 |
| | | | 55/345 |
| 2007/0234906 A1 * | 10/2007 | DeMarco | B01D 45/12 |
| | | | 96/384 |
| 2008/0016830 A1 * | 1/2008 | Witter | B01D 45/12 |
| | | | 55/337 |
| 2008/0282894 A1 | 11/2008 | Makarov | |
| 2009/0144932 A1 | 6/2009 | Yoo | |
| 2009/0307866 A1 * | 12/2009 | Witter | A47L 9/14 |
| | | | 15/353 |
| 2010/0218467 A1 * | 9/2010 | Witter | B01D 45/16 |
| | | | 55/337 |
| 2010/0236199 A1 | 9/2010 | Yokohama et al. | |
| 2010/0257826 A1 * | 10/2010 | Lin | B01D 45/14 |
| | | | 55/337 |
| 2012/0180255 A1 * | 7/2012 | Park | A47L 9/165 |
| | | | 15/353 |
| 2014/0223690 A1 * | 8/2014 | Witter | B01D 46/71 |
| | | | 15/353 |
| 2015/0129491 A1 | 5/2015 | Adey et al. | |
| 2016/0051994 A1 | 2/2016 | Toda | |
| 2017/0266596 A1 * | 9/2017 | Huntley | B04C 5/14 |
| 2017/0307253 A1 * | 10/2017 | Nett | F23D 14/68 |
| 2019/0133393 A1 * | 5/2019 | Cheng | A47L 9/1691 |
| 2019/0388907 A1 * | 12/2019 | Bowley | B04C 5/103 |
| 2021/0001356 A1 * | 1/2021 | Fitzsimmons | B04C 5/14 |
| 2021/0228036 A1 * | 7/2021 | Fitzsimmons | A47L 9/1463 |
| 2022/0061615 A1 | 3/2022 | Hillard | |
| 2022/0071462 A1 | 3/2022 | Hillard | |
| 2022/0111404 A1 | 4/2022 | Hillard | |
| 2022/0250093 A1 | 8/2022 | Huntley et al. | |

FOREIGN PATENT DOCUMENTS

| | | |
|---|---|---|
| CN | 301654474 | 8/2011 |
| CN | 101991391 B | 11/2014 |
| CN | 106859479 A | 6/2017 |
| EP | 1462179 A1 | 9/2004 |
| EP | 1849512 A1 | 10/2007 |

OTHER PUBLICATIONS

Mullet High-Speed Cyclone Dust Collector (online), (dated: May 20, 2021) Retrieved from Internet (Jan. 9, 2024), URL: https://www.amazon.com/dp/B095HYZT38 (3 pages) (Year: 2021).

Mullet High-Speed Cyclone Dust Collector (online), (dated: Oct. 3, 2022) Retrieved from Internet (Jan. 9, 2024), URL: https://mullettools.com/products/mullet-high-speed-cyclone-dust-collector (5 pages) (Year: 2022).

Oneida Air Systems (online), (dated: Oct. 10, 2023) Retrieved from Internet (Jan. 9, 2024), URL: https://www.walmart.com/ip/1970584034 (3 pages) (Year: 2023).

Jan. 30, 2024—(AU) Examination Report—App 2021331475.

Jun. 7, 2024—(EP) Partial EESR—App 2021331475.

Sep. 17, 2024—(EP) Rules 70(2) and 70a(2) Communication—App 21862841.0.

Aug. 29, 2024—(EP) EESR—App 21862841.0.

* cited by examiner

MONOLITHIC DUST SEPARATOR

CROSS-REFERENCE TO RELATED APPLICATIONS

This patent application is a continuation-in-part application of pending U.S. patent application Ser. No. 17/069,307 filed Oct. 13, 2020, entitled Monolithic Dust Separator which is incorporated herein by reference. This patent application also claims the benefit of U.S. Provisional Patent Application No. 63/070,861, filed Aug. 27, 2020, entitled Dust Collector Aparatus, and U.S. Provisional Patent Application No. 63/106,937, filed Oct. 29, 2020, entitled Dust Collector Aparatus which are also incorporated herein by reference.

TECHNICAL FIELD

Embodiments of the invention generally relate to systems for separating dust from a vacuum airstream.

Separating dust particles from an airstream created by a vacuum source has the benefit of collecting the dust particles into a convenient location, i.e. a dust receptacle so that the process dust can be easily collected and used or otherwise disposed of without filling the receptacle of the vacuum source or fouling a filter associated with the vacuum source. Some centrifugal collectors use cyclonic action to separate dust particles from a gas stream. In a typical cyclone chamber, the dust gas stream enters at an angle and is spun rapidly. The centrifugal force created by the circular flow throws the dust particles toward the wall of the cyclone chamber. After striking the wall, these particles fall into the receptacle located underneath. Existing solutions are bulky or awkward to use due to being made up of multiple pieces.

SUMMARY

In light of the foregoing background, the following presents a simplified summary of the present disclosure in order to provide a basic understanding of some aspects of the various implementations of this disclosure. This summary is not an extensive overview of the embodiments described herein. It is not intended to identify key or critical elements, or to delineate the scope of the embodiments described in this disclosure. The following summary merely presents some concepts of the embodiments of this disclosure in a simplified form as a prelude to the more detailed description provided below.

Embodiments of the invention address both of these problems by providing an integral, monolithic dust separator. In particular, in a first embodiment, the invention includes A monolithic dust separator for separating and collecting, from a stream of gas, dust particles suspended in the stream of gas while the stream of gas is in motion towards a vacuum source, the dust separator comprising: a vacuum port adapted to be connected to the vacuum source, a cyclone chamber, a tube in communication with the vacuum port and an upper end of the cyclone chamber, an input port adapted to be connected to a dust source, wherein the input port is formed in an upper portion of the cyclone chamber, and a dust receptacle comprising: an upper portion of the dust receptacle, the upper portion including a top upper surface, a port cover adapted to seal a port formed in the upper surface, wherein the port is adapted to empty the receptacle of collected dust particles, and a lower portion of the dust receptacle, wherein a lower portion of the cyclone chamber is integrally formed into the upper surface of the dust receptacle, and wherein the top upper surface slants downward from the cyclone chamber to the port cover.

In a second embodiment, the invention includes A monolithic dust separator for separating and collecting, from a stream of gas, dust particles suspended in the stream of gas while the stream of gas is in motion towards a vacuum source, the dust separator comprising: a vacuum port adapted to be connected to the vacuum source, a cyclone chamber, a substantially rigid tube in communication with the vacuum port and an upper end of the cyclone chamber, an input port adapted to be connected to a flexible hose adapted to ingest the dust particles, wherein the input port is formed in an upper portion of the cyclone chamber, and a dust receptacle comprising: an upper portion of the dust receptacle, the upper portion including a top upper surface, a dump-port cover adapted to seal a dump port formed in the upper surface, wherein the dump port is adapted to empty the receptacle of collected dust particles; and a bottom portion of the dust receptacle, the bottom portion comprising a tube support adapted to prevent deflection of the substantially rigid tube, wherein a lower portion of the cyclone chamber is integrally formed into the upper surface of the dust receptacle, and wherein the top upper surface slants downward from the cyclone chamber to the port cover.

In a third embodiment, the invention includes A monolithic dust separator for separating and collecting, from a stream of air, dust particles suspended in the stream of air while the stream of air is in motion towards a shop vacuum, the dust separator comprising: a vacuum port adapted to be connected to the shop vacuum, a cyclone chamber, a substantially rigid tube bent in an inverted-jay shape and in communication with the vacuum port and an upper end of the cyclone chamber, an input port adapted to be connected to a flexible hose for vacuuming up the dust particles, wherein the input port is formed in an upper portion of the cyclone chamber, and a dust receptacle comprising: an upper portion of the dust receptacle, the upper portion including a top upper surface, a dump-port cover adapted to seal a dump port formed in the upper surface, wherein the dump port is adapted to empty the receptacle of collected dust particles, a bottom portion of the dust receptacle, the bottom portion comprising a tube support adapted to prevent deflection of the substantially rigid tube, and a plurality of casters connected to the bottom portion of the dust receptacle, wherein a lower portion of the cyclone chamber is integrally formed into the upper surface of the dust receptacle, and wherein the top upper surface slants downward from the cyclone chamber to the port cover.

Aspects of this disclosure may relate to dust separators for separating and collecting, from a stream of gas, dust particles suspended in the stream of gas while the stream of gas is in motion towards a vacuum source. The dust separator can include a vacuum port configured to be connected to the vacuum source; a cyclone chamber, the cyclone chamber having an input port and an exit path, wherein the cyclone chamber has a parabolic shape; a substantially rigid tube in communication with the vacuum port and an upper end of the cyclone chamber; the input port configured to be connected to a dust source, wherein the input port is formed in an upper portion of the cyclone chamber; and a dust receptacle comprising: an upper portion of the dust receptacle, the upper portion including a top upper surface; a dump-port in the upper portion of the dust receptacle, the dump-port configured to empty the dust receptacle of collected dust particles; a lower portion of the dust receptacle configured for collection of dust particles, the lower portion of the dust receptacle is substantially cylindrical; and a plurality of casters connected to the lower portion of the dust receptacle. The top upper surface can slant downward from the cyclone chamber to the dump-port. The dust separator can include a dump-port cover configured to seal the dump-port formed in the top upper surface of the dust receptacle. The dust separator can include a tube support configured to prevent deflection of the substantially rigid tube. The cyclone chamber can be located vertically above the dump-port; and the cyclone chamber, a portion of the cyclone chamber exit path, and the dust receptacle can be integrally formed. The tube can be substantially rigid. The vacuum port can comprise a tee connector connected to the substantially rigid tube. At least a portion of the dump-port cover can be substantially transparent. The dump-port cover can be threaded onto a threaded lip integrally formed in the top upper surface. The contents of the dust receptacle can be observed through dump-port cover when it is threaded onto the top upper surface.

Aspects of this disclosure may also relate to a dust separators for separating and collecting, from a stream of gas, dust particles suspended in the stream of gas while the stream of gas is in motion towards a vacuum source. The dust separator can include a vacuum port configured to be connected to the vacuum source; a cyclone chamber, the cyclone chamber having an input port and an exit path; an input port, the input port is formed in an upper portion of the cyclone chamber; and a dust receptacle comprising: an upper portion of the dust receptacle, the upper portion including a top upper surface; a dump-port in the upper portion of the dust receptacle, the dump-port configured to empty the dust receptacle of collected dust particles; and a lower portion of the dust receptacle configured for collection of dust particles, the lower portion of the dust receptacle is substantially cylindrical. The dust separator can include a dump-port cover configured to seal the dump-port formed in the top upper surface of the dust receptacle; and the cyclone chamber can be located vertically above the dump-port. A substantially rigid tube can be in communication with the vacuum port and an upper end of the cyclone chamber; and the tube can comprise a 1.5-inch diameter PVC pipe. The dust separator can include a tube support configured to prevent deflection of the substantially rigid tube. The vacuum port can comprise a tee connector connected to the tube. At least a portion of the dump-port cover can be substantially transparent. The dust separator can comprise a plurality of casters connected to the lower portion of the dust receptacle. The cyclone chamber, a portion of the cyclone chamber exit path, and the dust receptacle can be integrally formed. The cyclone chamber can have a parabolic shape; and in some embodiments, the cyclone chamber can have a conical shape.

Aspects of this disclosure may also relate to a parabolic cyclone chambers for separating, from a stream of gas, particles suspended in the stream of gas while the stream of gas is in motion towards a vacuum source. The parabolic cyclone chamber can include a bottom having an opening; an upper surface; a curved sidewall connecting the bottom to the upper surface, the curved sidewall having an inflection point; a entry path in a top portion of the cyclone chamber; an exit path extending through the upper surface of the cyclone chamber; and a diverter wall sloping downward from the upper surface of the cyclone chamber toward and below the entry path. The parabolic cyclone chamber has a diameter at the bottom of the cyclone chamber "A"; a diameter at the widest portion of cyclone chamber "B"; and a diameter at the inflection point "ID". The ratio of the diameter of the bottom of the cyclone chamber "A" to the diameter at the widest portion of cyclone chamber "B" can be in the range of about 1:1.9 to about 1:2.7. The ratio of the diameter of the bottom of the cyclone chamber "A" to the diameter at the inflection point of cyclone chamber "ID" can be in the range of about 1:1.7 to about 1:2.5. The ratio of the diameter at the inflection point of cyclone chamber "ID" to the diameter at the widest portion of cyclone chamber "B" can be in the range of about 1:0.9 to about 1:1.3.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
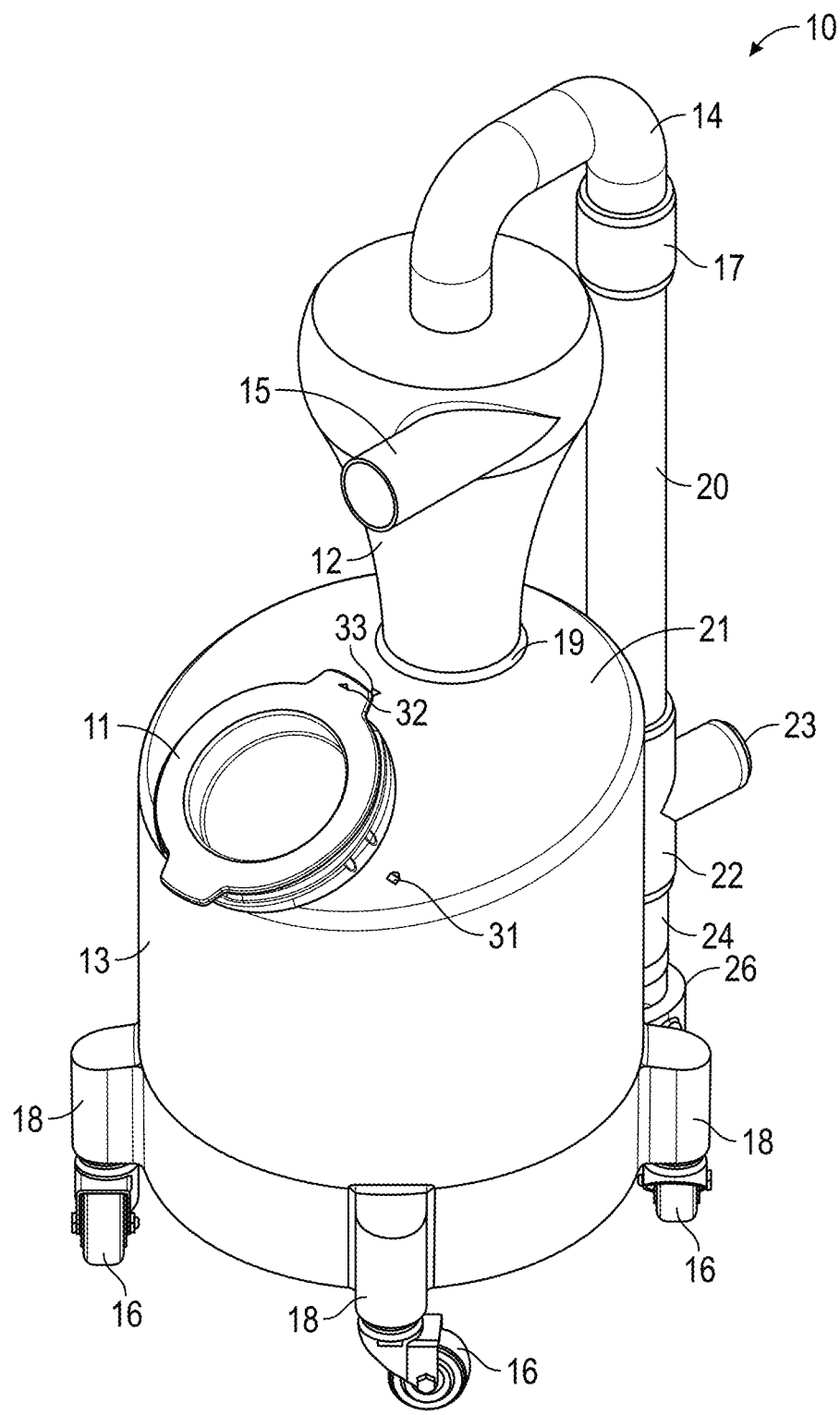
FIG. 1 is a perspective front view of one embodiment of a monolithic dust separator.

The drawing figures do not limit the invention to the specific embodiments disclosed and described herein. The drawings are not necessarily to scale, emphasis instead being placed upon clearly illustrating the principles of the invention.

DETAILED DESCRIPTION

The subject matter of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be understood by one skilled in the art and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. For example, portions of each embodiment may be combined together into other combinations. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Figure 2:
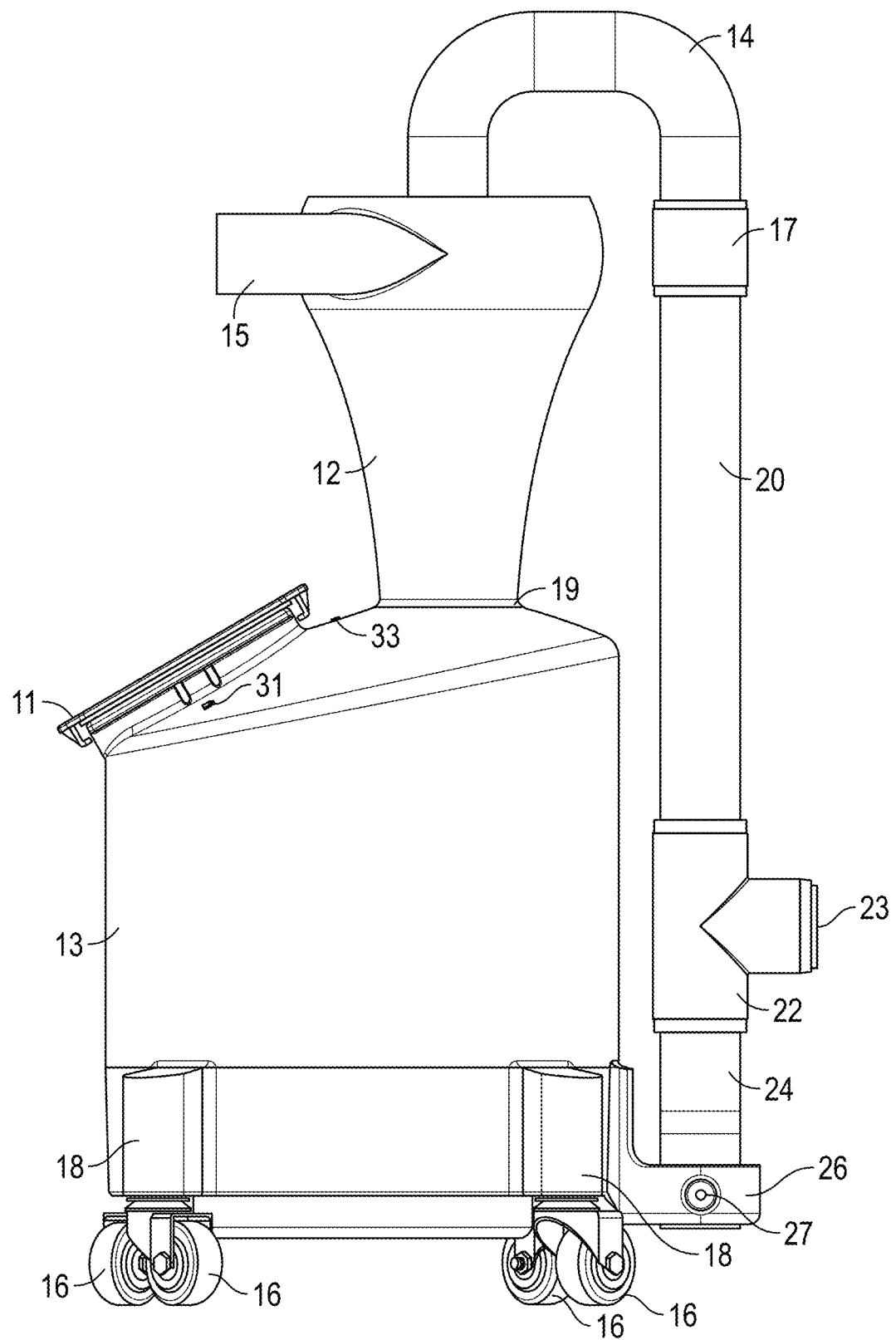
FIG. 2 is a side view of one embodiment of a monolithic dust separator.
Figure 3:
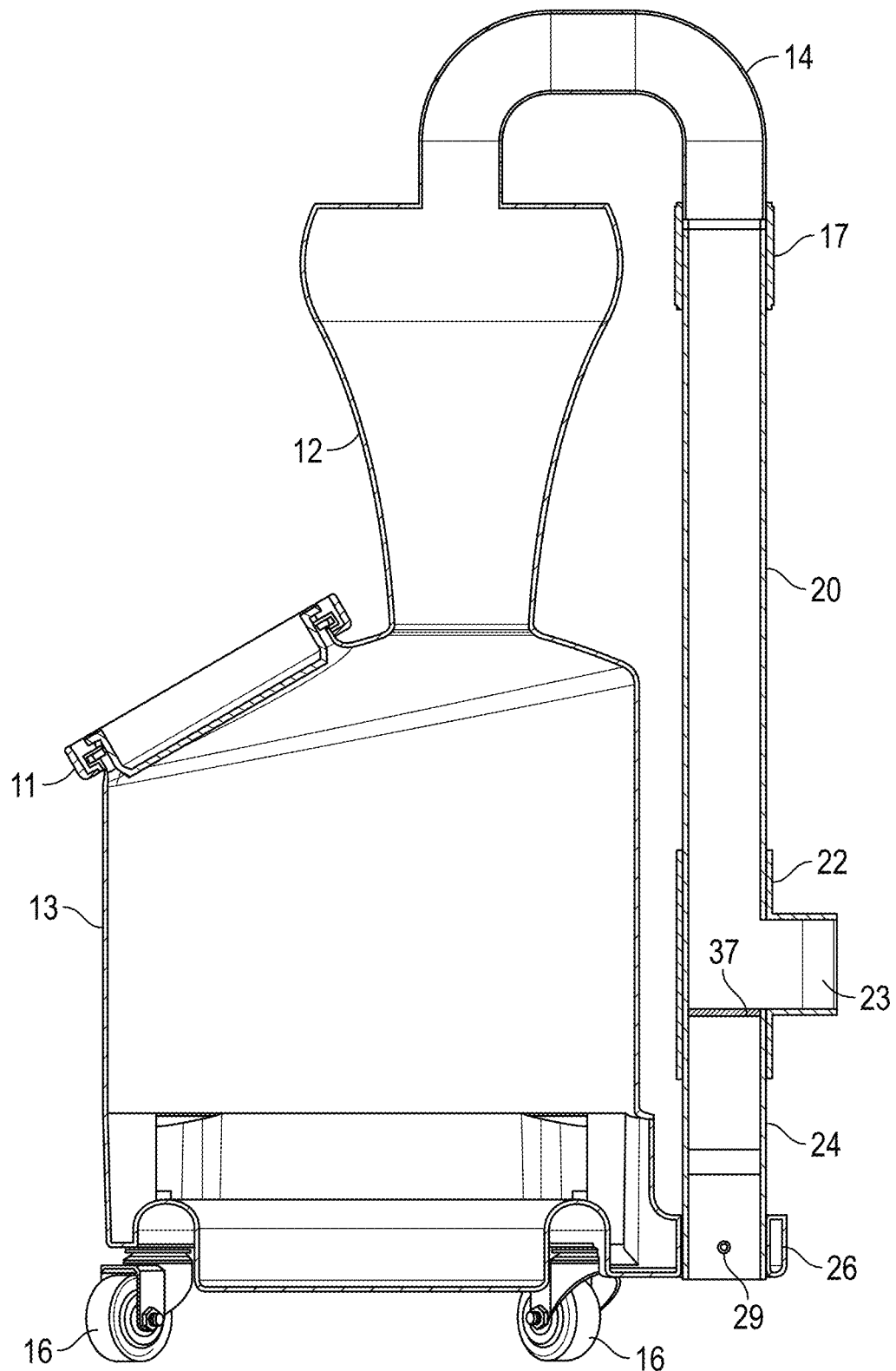
FIG. 3 is a sectional side view of one embodiment of a monolithic dust separator.

FIGS. 1 through 3 illustrate an embodiment of monolithic dust separator 10. FIG. 1 is a perspective front view of one embodiment of monolithic dust separator 10. In some embodiments, the monolithic dust separator is formed as a single piece from caster supports 18 all the way up to integral cyclone chamber 12. In some embodiments, cyclone chamber 12 is a parabolic cyclone. In various embodiments, cyclone chamber 12 is formed separately and adhered to upper surface 21 of dust receptacle 13, for example, by way of receiving flange 19. In some embodiments, such a single-piece monolith is manufactured by way of an additive manufacturing process. In alternative embodiments, the single piece is manufactured using rotational molding (rotomolding). Rotomolding is a process of heating powder polymers (such as polyethelyne or nylon) in a hollow, metal mold as the mold is rotated. As the powder is heated, it melts and forms to the metal mold as the metal mold is rotated and gravity causes the melting powder (or pellets) to be dispersed along interior surfaces of the metal mold, gradually forming an integral plastic part having the form of the metal mold.

In one embodiment, the monolithic dust separator 10 has tee-shaped vacuum port 23, which is formed so that it can be connected to a vacuum source, such as a shop vacuum. In this embodiment, the shop vacuum (not shown) is connected via a flexible hose at vacuum port 23. In an alternative embodiment, vacuum port 23 is positioned at height so that vacuum port 23 mates up directly with the input suction port of the shop vacuum and an intermediate flexible hose is not required. In this embodiment, the shop vacuum has casters similar to casters 16 on the monolithic dust separator 10, and the shop vacuum and the monolithic dust separator 10 become an integrated two-part system that can be rolled around and used to vacuum dust and separate it into dust receptacle 13 of the monolithic dust separator 10 with only a small amount of the ingested dust passing on to the shop vacuum, thereby preventing the shop vacuum from filling up with dust and from fouling a dust filter associated with the vacuum source.

In some embodiments the substantially rigid, cylindrical tube 20 that connects vacuum port 23 to cyclone chamber 12 is made up of several segments. In this embodiment, the segments include bent segment 14 that completes a bent portion of an inverted-jay shape that forms a bend from vacuum port 23 to a top portion of cyclone chamber 12. In some embodiments, bent segment 14 is connected to tube 20 by way of union 17. In such an embodiment, lower tube 24 is connected to tee-connector 22 which is further connected to tube support 26. Tube support 26 provides support to the overall tube structure to prevent it from deflecting in use and to provide an overall rigid connection point for vacuum port 23 to be connected to a vacuum source, either directly or via a flexible hose.

In some embodiments, input port 15 is integrated into cyclone chamber 12 such that it is typically adapted to connect to a flexible vacuum hose. The flexible vacuum hose can then be connected to any kind of a dust source, such as a mill or a saw that would produce sawdust as part of cutting or otherwise processing wood. In other embodiments, the dust source may be associated with other types of industrial processes, building construction, or demolition.

Once sufficient process dust is accumulated in dust receptacle 13, the accumulated dust may be emptied from dust receptacle 13. In some embodiments, an operator of the monolithic dust separator 10 can ascertain the amount of accumulated dust by looking into dust receptacle 13 through the substantially transparent or clear dump port cover 11, which covers a dump port in dust receptacle 13. If the operator determines that the dust receptacle 13 is sufficiently full of dust, the operator can remove dump port cover 11 by unscrewing or unthreading it from the lip formed in upper surface 21 of dust receptacle 13. In one embodiment, dump port cover 11 has an arrow indicium 32 indicating whether it is in a locked position (as indicated by lock indicium 31) or otherwise in an open position as shown in FIG. 1, with the arrow indicium pointing to unlocked indicium 33. When dump port cover 11 is in an open position, it can be removed. Once dump port cover 11 has been removed, the accumulated dust contents of the dust separator can be dumped out of the dust separator into a suitable dust disposal location, such as a dumpster or incinerator or any other suitable dust disposal location.

FIG. 2 is a side view of one embodiment of a monolithic dust separator. This side view provides an unobstructed side view of tube 20, which connects vacuum port 23 to cyclone chamber 12. In some embodiments, tube 20 is made up of several segments. In these embodiments, the segments include bent segment 14 that completes a bent portion of an inverted-jay shape that forms a bend from vacuum port 23 to a top portion of cyclone chamber 12. In some embodiments, bent segment 14 is connected to tube 20 by way of union 17. In such embodiments, lower tube 24 is connected to tee-connector 22 which is further connected to tube support 26. Tube support 26 provides support to the overall tube structure to prevent it from deflecting in use and to provide an overall rigid connection point for vacuum port 23 to be connected to a vacuum source, either directly or via a flexible hose. In some embodiments, lower tube 24 is held in place within tube support 26 with fastener 27. In some embodiments, fastener 27 is made up of a bolt and a threaded cap or nut and washer.

FIG. 3 is a sectional side view of one embodiment of a monolithic dust separator. In this sectional view, it can be seen that this particular embodiment, tube 20 may be a single, integral piece that extends from union 17 down through tee 22 and into tube support 26. In this embodiment, lower tube 24 is integral with tube 20. It can also be seen that tube 20 has an opening near vacuum port 23 so that the vacuum suction causes airflow outward from cyclone chamber 12 and out through vacuum port 23. Sectional portion 29 of fastener 27 is shown as it fastens lower tube 24 (here an integral part of tube 20) with tube support 26. In some embodiments, tubes 20 and 24 are separate and distinct. In some embodiments, internal cap 37 is inserted into a top portion of tube 24, creating an airpath outward through vacuum port 23, and also preventing dust particles or other materials from falling into the cavity below internal cap 37. Tube 24 as inserted into the bottom portion of tee 22 and being supported by tube support 26 provides extra rigidity for vacuum port 23, so that it can be rigidly connected directly to a shop vacuum or to a flexible hose that is connected to a vacuum source.

Figure 4:
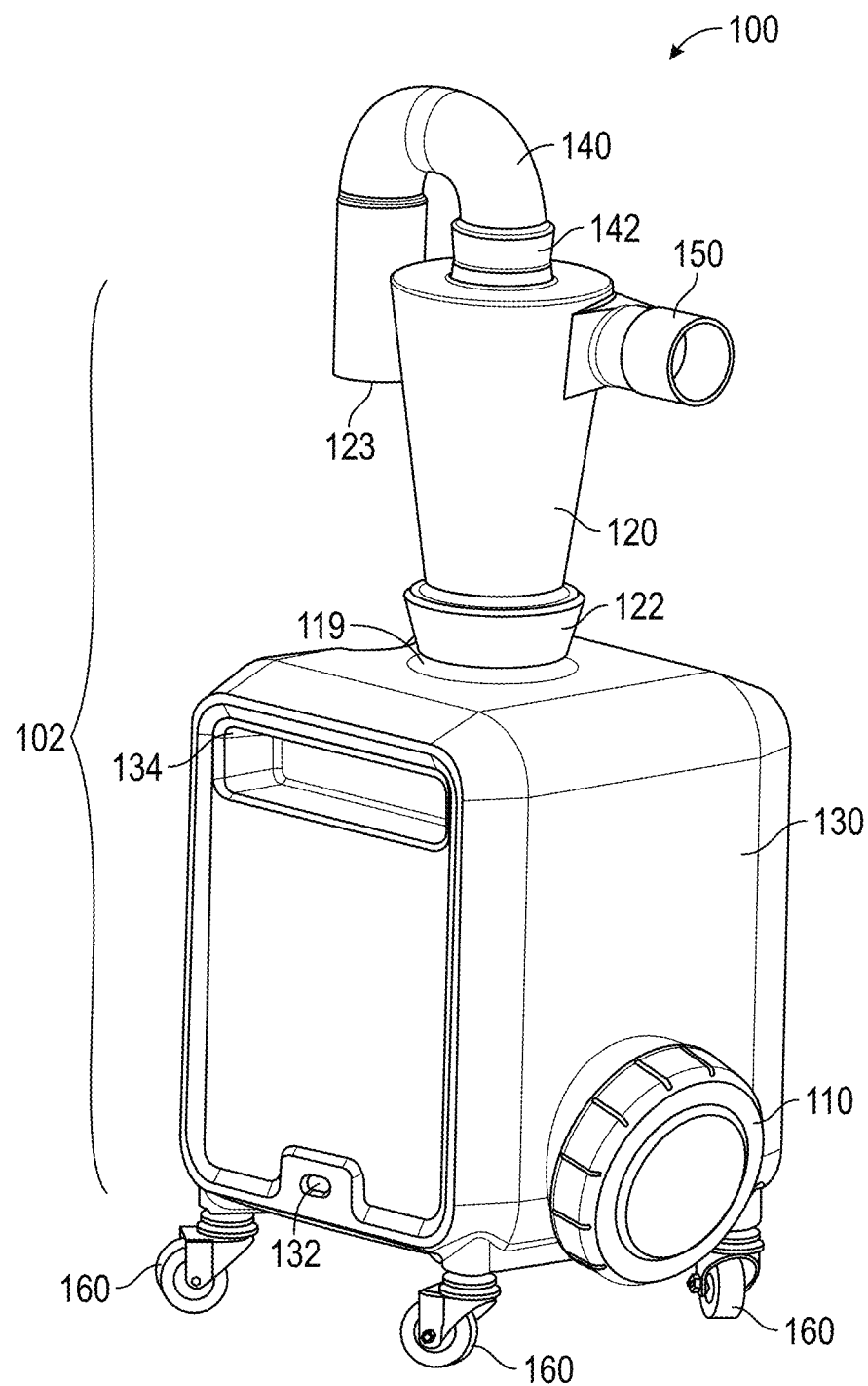
FIG. 4 is a perspective side view of a first alternative embodiment of a monolithic dust separator.

FIGS. 4 through 7 illustrate a first alternative embodiment of a monolithic dust separator. FIG. 4 is a perspective side view of the first alternative embodiment of a monolithic dust separator 100. In some embodiments, the monolithic dust separator 100 has vacuum port 123, which is formed so that it can be connected to a vacuum source, such as a shop vacuum. In these embodiments, the shop vacuum (not shown) is connected via a flexible hose at vacuum port 123. Bent segment 140 is connected to an upper portion of cyclone chamber 120. In some embodiments, bent segment 140 connects to cyclone flange 142, which fits atop cyclone chamber 120 and is integral to overall monolithic dust collector body 102. In some embodiments, such an overall monolithic dust collector body is manufactured by way of rotomolding processes or by way of additive manufacturing techniques. In some embodiments, input port 150 is integrated into cyclone chamber 120 such that it is typically adapted to connect to a flexible vacuum hose. The flexible vacuum hose can then be connected to any kind of a dust source, such as a mill or a saw that would produce sawdust as part of cutting or otherwise processing wood. In other embodiments, the dust source may be associated with other types of industrial processes, building construction, or demolition.

Once sufficient process dust is accumulated in dust receptacle 130, the accumulated dust may be emptied from dust receptacle 130. In some embodiments, the process of removing the contents from dust receptacle 130 involves moving the entire monolithic dust separator 100 to a convenient location, i.e., to a table or workbench, positioning the monolithic dust separator 100 on its side and opening dust dump port cover 110 to dump out the contents of dust receptacle 130. In some embodiments, monolithic dust separator 100 can be lifted by way of handles 134 above a suitable dust disposal location at which time dust dump port cover 110 can be removed to empty the contents of dust receptacle 130 into the suitable dust disposal location. In alternative embodiments, the monolithic dust separator 100 is mounted above the floor, for example on a wall or shelf. In some such embodiments, mounting recess 132 is adapted to receive a portion of a mounting bracket (not shown) to help support the monolithic dust separator 100 when mounted on a wall, for example. In such embodiments, a dump port hose or other channel can be connected to the dump port so that dust continually empties into a suitable dust disposal location or hopper. In some embodiments, dust port cover is threaded onto a flange integral to dust receptacle 130 (flange 111 of FIG. 6).

In some embodiments, cyclone chamber 120 sits directly atop dust receptacle 130. In alternative embodiments as illustrated in FIG. 4, cyclone chamber 120 is connected to dust receptacle 130 by way of vortex chamber 122. In some embodiments, cyclone chamber 120, vortex chamber 122, and dust receptacle 130 are made up of a single monolithic piece. In alternative embodiments, cyclone chamber 120, vortex chamber 122, and dust receptacle 130 are separate components. In one embodiment, cyclone chamber 120 is received by and adhered into vortex chamber 122 which is further connected to dust receptacle 130 by way of receiving flange 119. These individual connections can be permanently connected by way of a press-fit or glued together with a suitable epoxy glue or other adhesive. In some embodiments, optional casters 160 are employed so that the monolithic dust separator 100 can be wheeled around.

Figure 5:
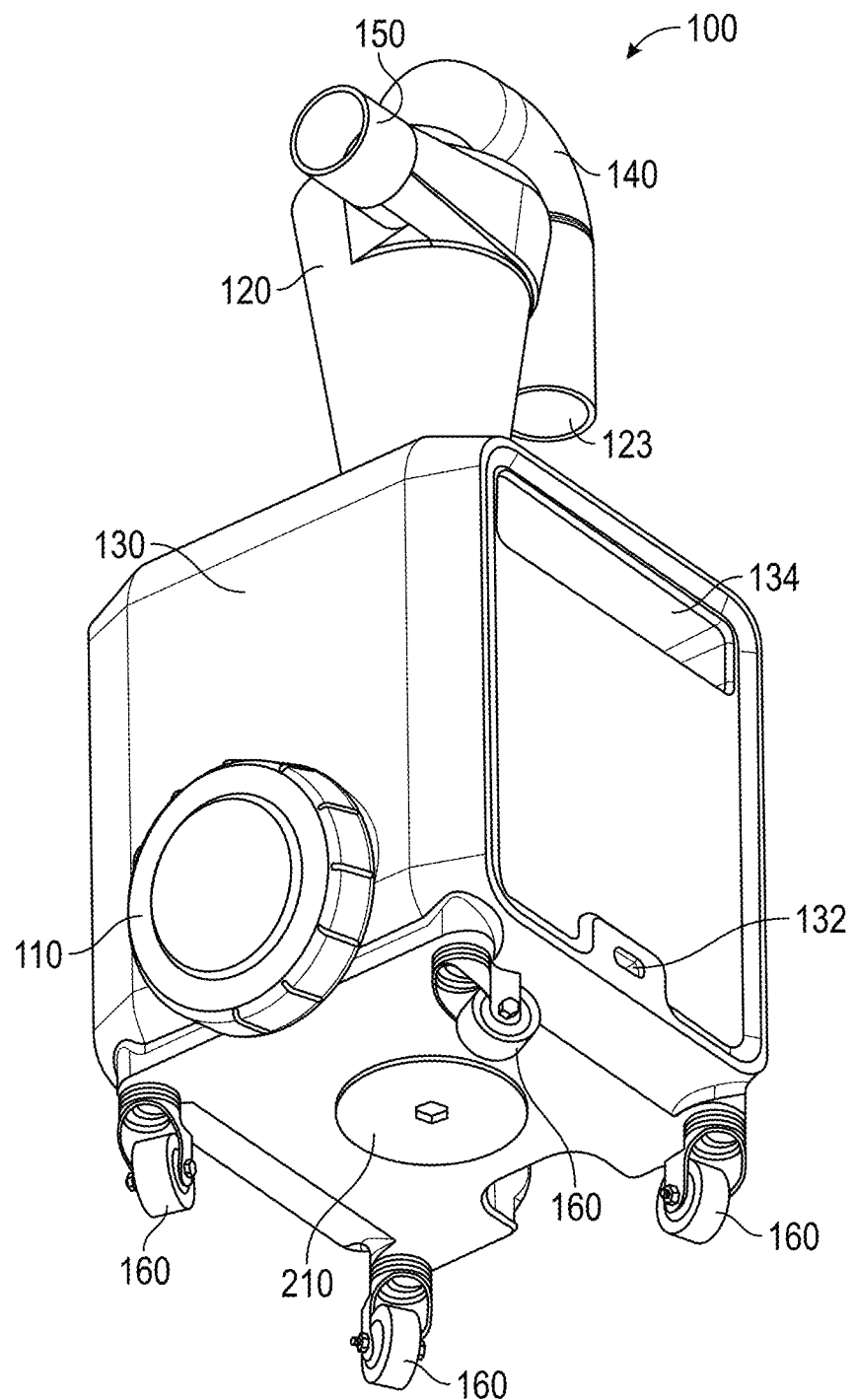
FIG. 5 is a perspective bottom view of a first alternative embodiment of a monolithic dust separator.

FIG. 5 is a perspective bottom view of the first alternative embodiment of the monolithic dust separator 100. From this bottom view, access port cover 210 is visible. In some embodiments, an associated access port, which access port cover 210 seals may be used for manufacturing, assembly, or repair of the monolithic dust separator 100. In some embodiments, access port cover 210 is threaded into the body of dust receptacle 130. In these embodiments, when access port cover 210 is not present in the body of the monolithic dust separator 100, an assembly or repair technician can reach into the body of the dust receptacle 130 to, for example, attach a fastener to casters 160. In some embodiments, casters 160 are threaded into threaded holes in the body of dust receptacle 130. In alternative embodiments, threaded studs of casters 160 are received in unthreaded holes in the dust receptacle 130. In these embodiments, an optional washer is placed over the threaded stud and a nut is threaded onto the stud and tightened to attach casters 160 to the dust receptacle 130. In some embodiments, the access port is used to insert a cyclone tube into the cyclone chamber 120 as further described in connection with cross-sectional FIG. 7 below.

Figure 6:
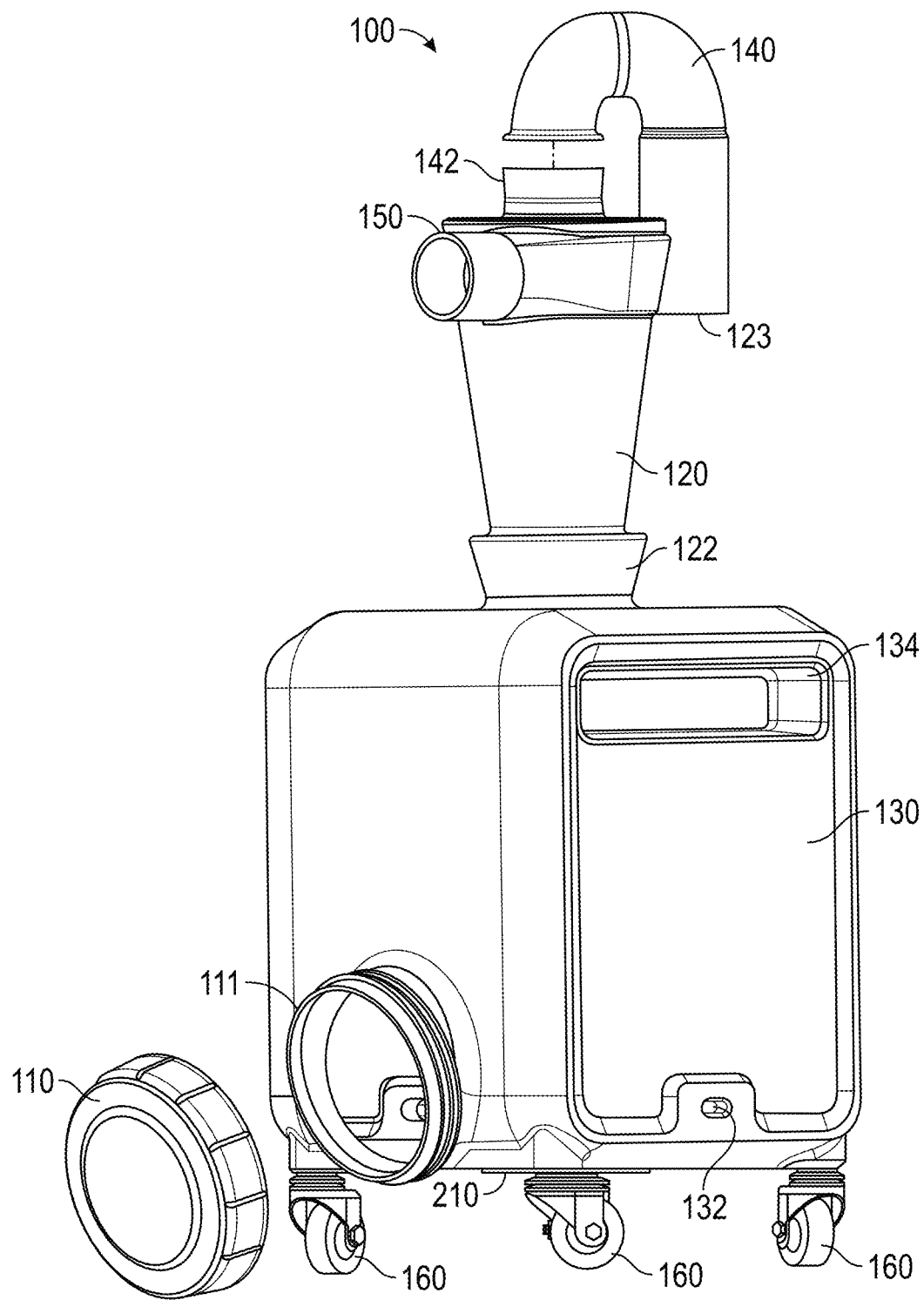
FIG. 6 is a perspective side view of a first alternative embodiment of a monolithic dust separator.

FIG. 6 is a perspective side view of the first alternative embodiment of a monolithic dust separator. In some embodiments, the process of removing the contents from dust receptacle 130 involves moving the entire monolithic dust separator 100 to a convenient location, i.e., to a table or workbench, positioning the monolithic dust separator 100 on its side and opening dust dump port cover 110 (as shown) to dump out the contents of dust receptacle 130. In some embodiments, monolithic dust separator 100 can be lifted by way of handles 134 above a suitable dust disposal location at which time dust dump port cover 110 can be removed to empty the contents of dust receptacle 130 into the suitable dust disposal location. In alternative embodiments, the monolithic dust separator 100 is mounted above the floor, for example on a wall or shelf. In some such embodiments, mounting recess 132 is adapted to receive a portion of a mounting bracket (not shown) to help support the monolithic dust separator 100 when mounted on a wall, for example. In such embodiments, a dump port hose or other channel can be connected to the dump port so that dust continually empties into a suitable dust disposal location or hopper. In some embodiments, dust dump port cover 110 may be threaded onto flange 111. Bent segment 140 is shown expanded from an upper portion of cyclone chamber 120. In some embodiments, bent segment 140 is adapted to connect with cyclone flange 142, which fits atop cyclone chamber 120 and is integral to an overall monolithic dust collector body.

Figure 7:
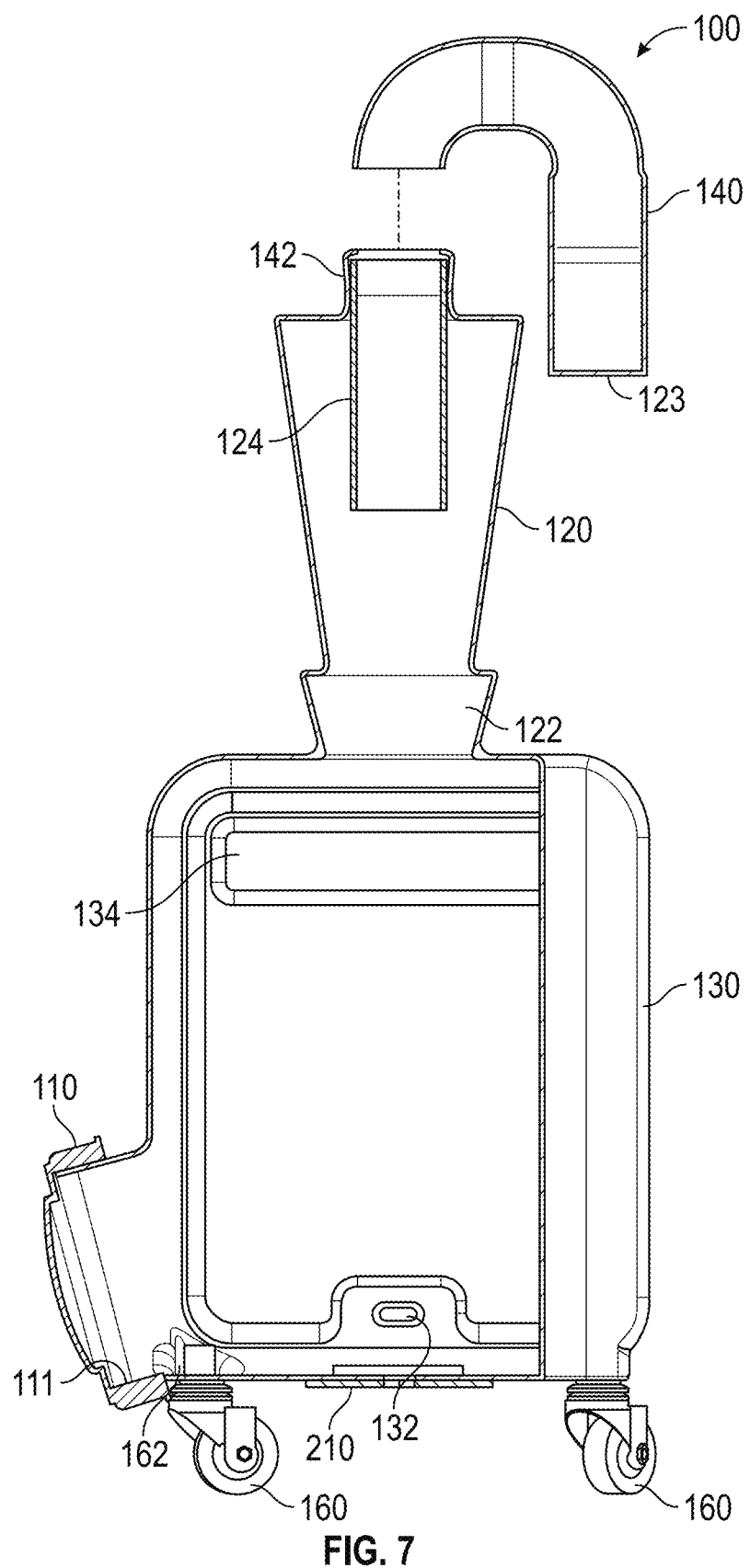
FIG. 7 is a sectional side view of a first alternative embodiment of a monolithic dust separator.

FIG. 7 is a sectional side view of the first alternative embodiment of a monolithic dust separator 100. Bent segment 140 is shown expanded from an upper portion of cyclone chamber 120. In some embodiments, bent segment 140 is adapted to connect with cyclone flange 142, which fits atop cyclone chamber 120 and is integral to an overall monolithic dust collector body. In some embodiments, dust dump port cover 110 may be threaded onto flange 111 as shown. In some embodiments, cyclone tube 124 is inserted into an upper portion of cyclone chamber 120 as shown. In some embodiments, cyclone tube 124 is adhered into an interior portion of flange 142 with glue or other adhesive. In alternative embodiments cyclone tube 124 is installed tightly by being force-driven into a press-fit at flange 142. In yet alternative embodiments, alternatively or in addition to adhesive and/or press fit, set screws (not shown) are employed to secure cyclone tube 124 into a stable position within cyclone chamber 120. In some embodiments, cyclone tube 124 functions to further facilitate dust separation and to limit ingestion of suspended dust into the airstream flowing into the vacuum source through vacuum port 123.

Figure 8:
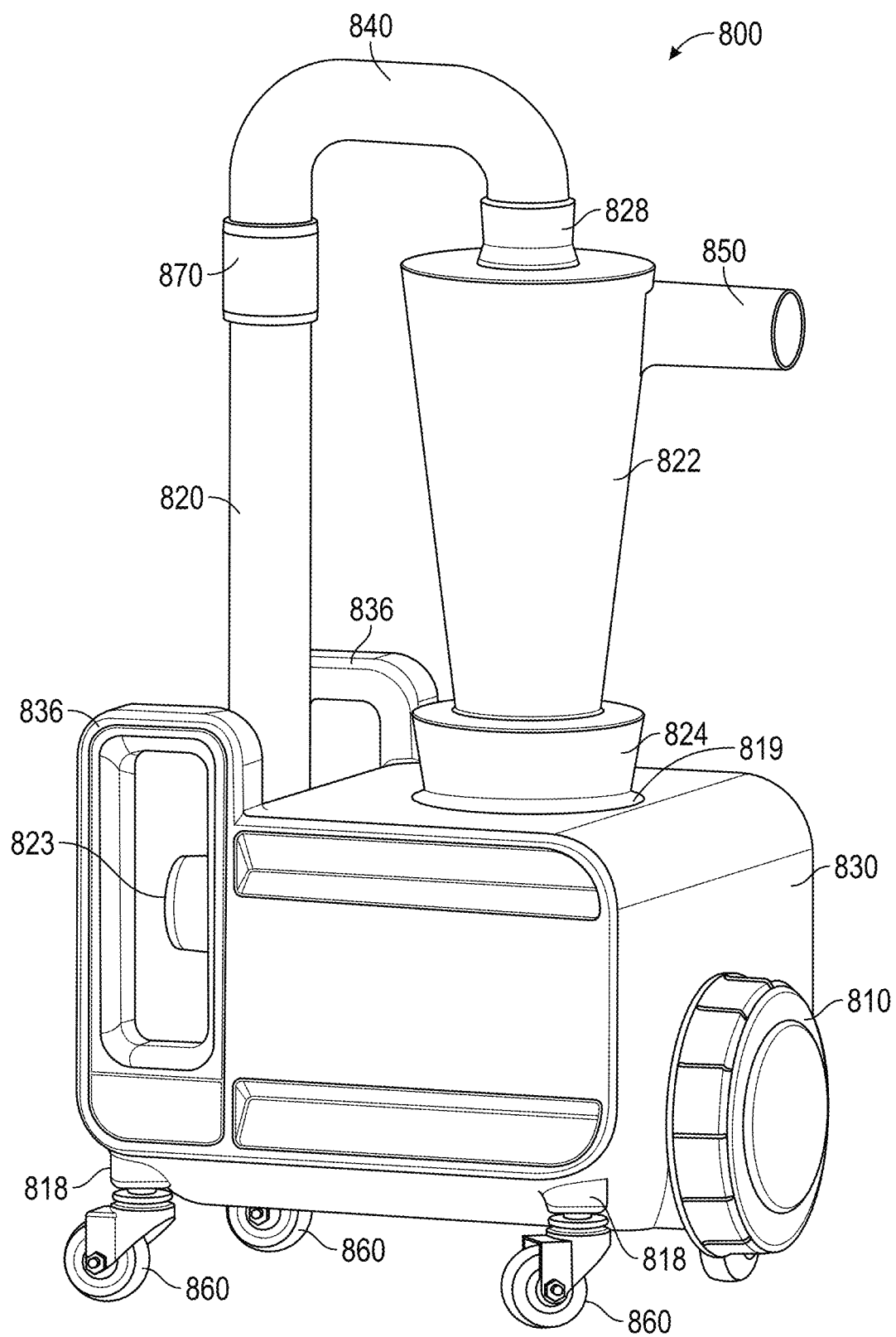
FIGS. 8 and 9 are perspective side views of a second alternative embodiment of a monolithic dust separator.
Figure 9:
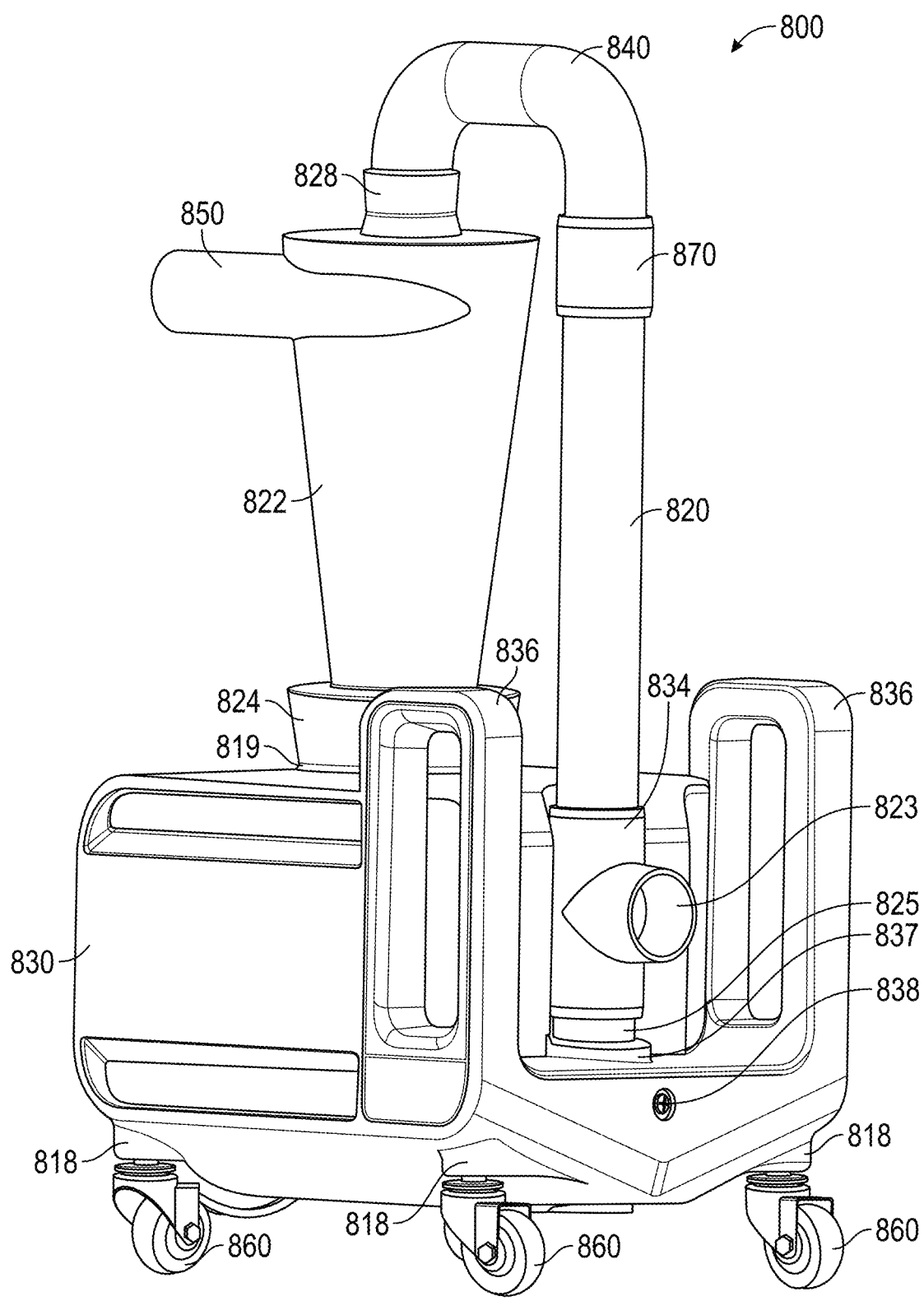

FIGS. 8 and 9 are perspective side views of a second alternative embodiment of a monolithic dust separator 800. In some embodiments, the monolithic dust separator is formed as a single piece from caster supports 818 all the way up to integral cyclone chamber 822. In alternative embodiments, cyclone chamber 822 is formed separately and adhered to optional vortex chamber 824 which is optionally integrated into dust receptacle 830, for example, by way of receiving flange 819. In some embodiments, bent segment 140 connects to cyclone flange 828, which fits atop cyclone chamber 822 and is integral to an overall monolithic dust collector body. In some embodiments, such a single-piece monolith is manufactured by way of an additive manufacturing process. In alternative embodiments, the single piece is manufactured using rotomolding techniques as described in connection with FIG. 1.

In one embodiment, the monolithic dust separator 800 has tee-shaped vacuum port 823, which is formed so that it can be connected to a vacuum source, such as a shop vacuum. In this embodiment, the shop vacuum (not shown) is connected via a flexible hose at vacuum port 823. In an alternative embodiment, vacuum port 823 is positioned at a height so that vacuum port 823 mates up directly with the input suction port of the shop vacuum and an intermediate flexible hose is not required. In this embodiment, the shop vacuum has casters similar to casters 860 on the monolithic dust separator 800, and the shop vacuum and the monolithic dust separator 800 become an integrated two-part system that can be rolled around and used to vacuum dust and separate it into dust receptacle 830 of the monolithic dust separator 800 with only a small amount of the ingested dust passing on to the shop vacuum, thereby preventing the shop vacuum from filling up with dust and from fouling a dust filter associated with the vacuum source.

In some embodiments the substantially rigid, cylindrical tube 820 that connects vacuum port 823 to cyclone chamber 822 is made up of several segments. In this embodiment, the segments include bent segment 840 that completes a bent portion of an inverted-jay shape that forms a bend from vacuum port 823 to a top portion of cyclone chamber 822. In some embodiments, bent segment 840 is connected to tube 820 by way of union 870. In such an embodiment, lower tube 825 (of FIG. 9) is connected to tee-connector 834 which is further connected to tube support 837. Tube support 837 provides support to the overall tube structure to prevent it from deflecting in use and to provide an overall rigid connection point for vacuum port 823 to be connected to a vacuum source, either directly or via a flexible hose.

In some embodiments, input port 850 is integrated into cyclone chamber 822 such that it is typically adapted to connect to a flexible vacuum hose. The flexible vacuum hose can then be connected to any kind of a dust source, such as a mill or a saw that would produce sawdust as part of cutting or otherwise processing wood. In other embodiments, the dust source may be associated with other types of industrial processes, building construction, or demolition. cyclone chamber 822 is connected to dust receptacle 830 by way of vortex chamber 824. In some embodiments, cyclone chamber 822, vortex chamber 824, and dust receptacle 830 are made up of a single monolithic piece. In alternative embodiments, cyclone chamber 822, vortex chamber 824, and dust receptacle 830 are separate components. In one embodiment, cyclone chamber 822 is received by and adhered into vortex chamber 824 which is further connected to dust receptacle 830 by way of receiving flange 819. These individual connections can be permanently connected by way of a press-fit or glued together with a suitable epoxy glue or other adhesive.

In such embodiments, lower tube 825 is connected to tee-connector 834 which is further connected to tube support 837. Tube support 837 provides support to the overall tube structure to prevent it from deflecting in use and to provide an overall rigid connection point for vacuum port 823 to be connected to a vacuum source, either directly or via a flexible hose. In some embodiments, lower tube 825 is held in place within tube support 837 with fastener 838. In some embodiments, fastener 838 is made up of a bolt and a threaded cap or nut and washer. Alternatively, fastener 838 may be a screw or a set screw that is adapted to fixedly hold lower tube 825 in place.

Once sufficient process dust is accumulated in dust receptacle 830, the accumulated dust may be emptied from dust receptacle 830. In some embodiments, an operator of the monolithic dust separator 800 can ascertain the amount of accumulated dust by looking into dust receptacle 830 through the substantially transparent or clear port cover 810. If the operator determines that the dust receptacle 830 is sufficiently full of dust, the operator can remove port cover 810 by unscrewing or unthreading it from the lip formed in dust receptacle 830. When port cover 810 is unthreaded, it can be removed. Once port cover 810 has been removed, the accumulated dust contents of the dust separator can be dumped out of the dust separator into a suitable dust disposal location, such as a dumpster or incinerator or any other suitable dust disposal location. In some embodiments, monolithic dust separator 800 can be lifted by way of handles 836 above a suitable dust disposal location at which time dust port cover 810 can be removed to empty the contents of dust receptacle 830 into the suitable dust disposal location. In alternative embodiments, the monolithic dust separator 800 is mounted above the floor, for example on a wall or shelf. In such embodiments, a dump port hose or other channel can be connected to the dump port so that dust continually empties into a suitable dust disposal location or hopper.

FIGS. 10-18 illustrate another embodiment of the dust separator 900. The dust separator 900 is similar to dust separator 10 shown in FIGS. 1-3. Like in the dust separator embodiment 10 described in relation to FIGS. 1-3, the dust separator embodiment 900 shown in FIGS. 10-18 can include similar components that operate in a similar fashion. These components are labeled with like reference numerals in the accompanying drawings but use 900 series reference numerals rather than the 010 series reference numerals used in FIGS. 1-3. Because of the similarity of the components and function of the components in dust separator embodiment 10 and dust separator embodiment 900 particular components and functions are not restated in detail with regard to embodiment 900.

Figure 10:
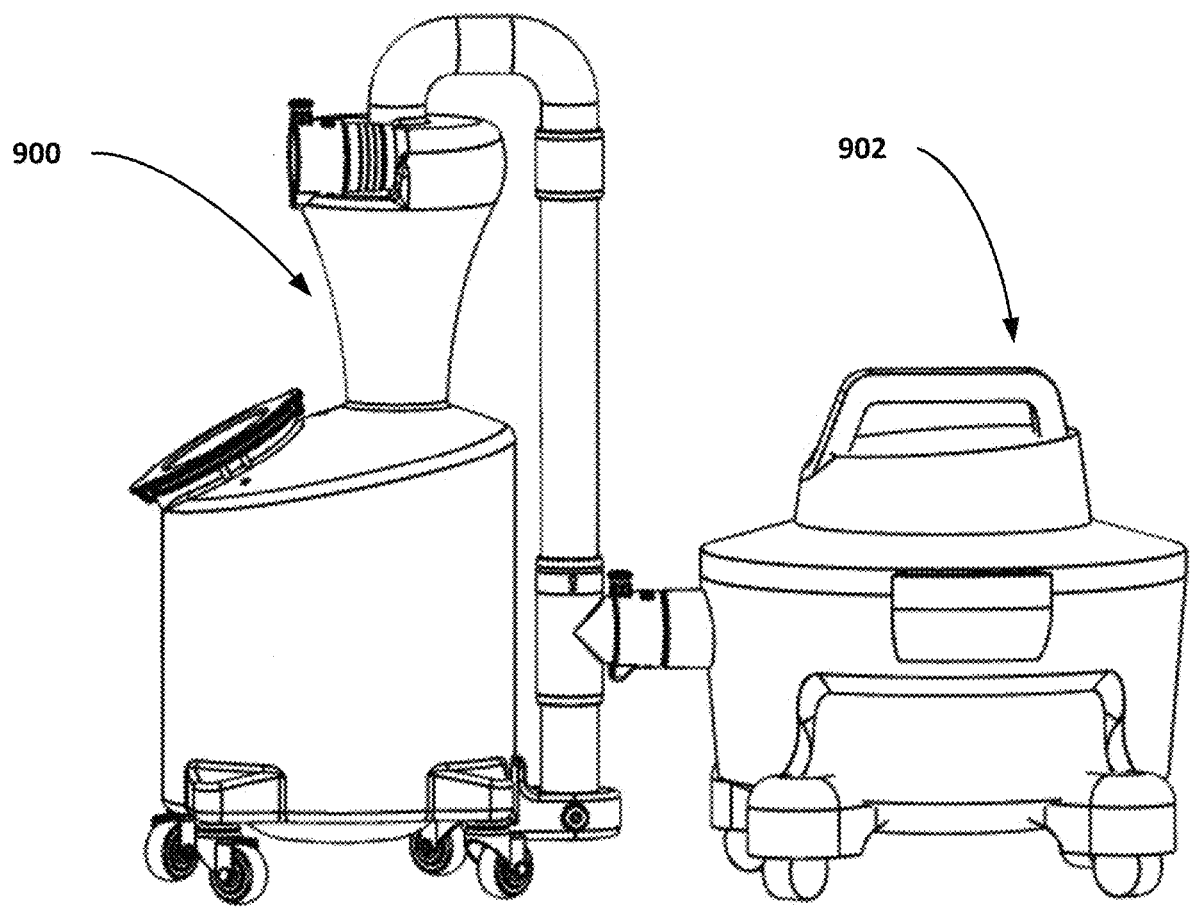
FIG. 10 is a perspective side view of one embodiment of a dust separator and vacuum.

Similar to the embodiment shown in FIGS. 1-3, a dust separator 900 is shown in FIGS. 10-18. The dust separator 900 can be used for separating and collecting dust particles suspended in the stream of gas while the stream of gas is in motion towards a vacuum source. In one example, and as shown in FIG. 10, the vacuum source can be a vacuum such as a shop vacuum 902. The vacuum can be connected to the dust separator 900 by a flexible hose or, as shown in FIG. 10, a rigid connection.

Similar to dust separator 10, dust separator 900 includes a vacuum port 923 adapted to be connected to the vacuum source 902; a cyclone chamber 912, and a tube 920 in communication with the vacuum port 923 and an exit path 909 of the cyclone chamber 912. As described above, and as will be described in more detail below, the cyclone chamber 912 can have a curved sidewall or parabolic shape. In other embodiments, not shown in FIGS. 10-18, the cyclone chamber 912 could have straight sidewalls and could form a conical shape. Additionally, as described above, the tube 920 can be substantially rigid. Further, as described above and as shown in FIGS. 10-18 the vacuum port 923 can comprise a tee connector 922 (or blind tee connector) connected to the substantially rigid tube 20. The cyclone chamber 912 includes an input port 915 adapted to be connected to a dust source. For example, in some embodiments, a flexible hose can be connected to the input port 915 for vacuuming dust particles. As shown in FIGS. 10-18, the input port 915 is formed in an upper portion of the cyclone chamber 912 and forms an entry path 907 into the cyclone chamber. The entry path 907 is substantially perpendicular to the exit path 909. The cyclone chamber 912 (shown in FIGS. 10-18) differs from cyclone chamber 12 in that it also includes a diverter wall 904. The diverter wall 904 generally slopes downward from an upper surface of the cyclone chamber 912 toward and/or below the entry path 907. During use, the diverter wall 904 may help divert lighter material into the cyclone air path thereby allowing the dust separator 10 to collect more material. As shown in FIGS. 10-18, the cyclone chamber 912 can be formed without a vortex finder.

As shown in FIGS. 10-18, the inlet port 915 and the vacuum port 923 can include adapters 961. The adapters can be configured to attach to multiple different types of vacuums and vacuum hoses and/or tools. Such adapters are shown and described in U.S. patent application Ser. No. 17/088,064, which is incorporated in its entirety herein by reference.

Additionally, similar to dust separator 10, dust separator 900 includes a dust receptacle 913 for collecting dust and other debris. The dust receptacle 913 includes an upper portion 931 having a top upper surface 921. The dust receptacle 912 also includes a dump-port in extending through the upper surface 921 of the upper portion 931 of the dust receptacle 913. As described above, the dump-port is used to empty the dust receptacle of collected dust particles and debris. As described above, the top upper surface 921 can generally slant downward from the cyclone chamber 912 to the dump-port. Thus, as shown in FIGS. 10-18 the cyclone chamber 912 is located vertically above the dump-port. In other embodiments, the top upper surface 921 may be substantially flat or otherwise may not slant downward from the cyclone chamber 912 to the dump-port.

Figure 11:
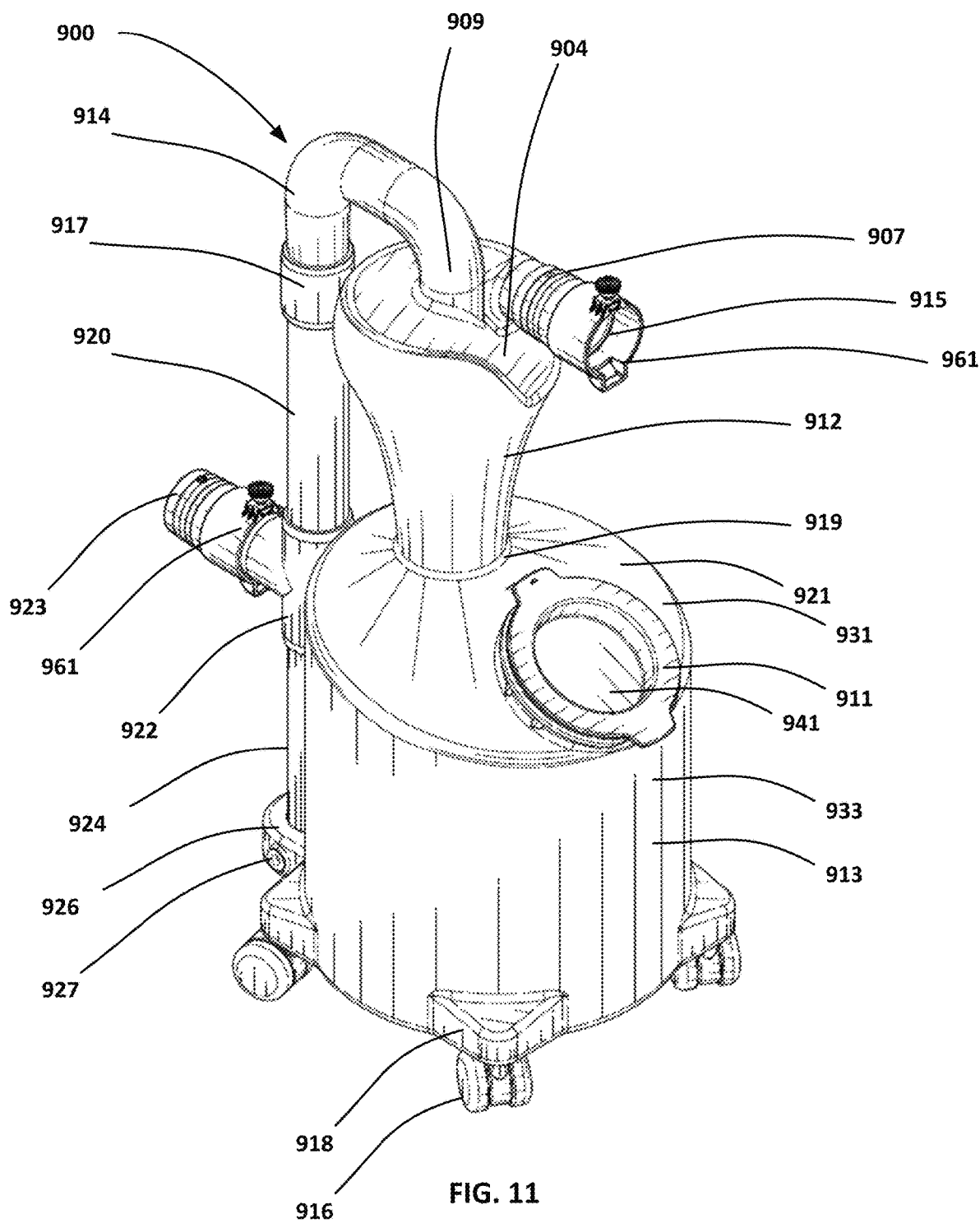
FIG. 11 is a front, left perspective view of one embodiment of a dust separator.
Figure 12:
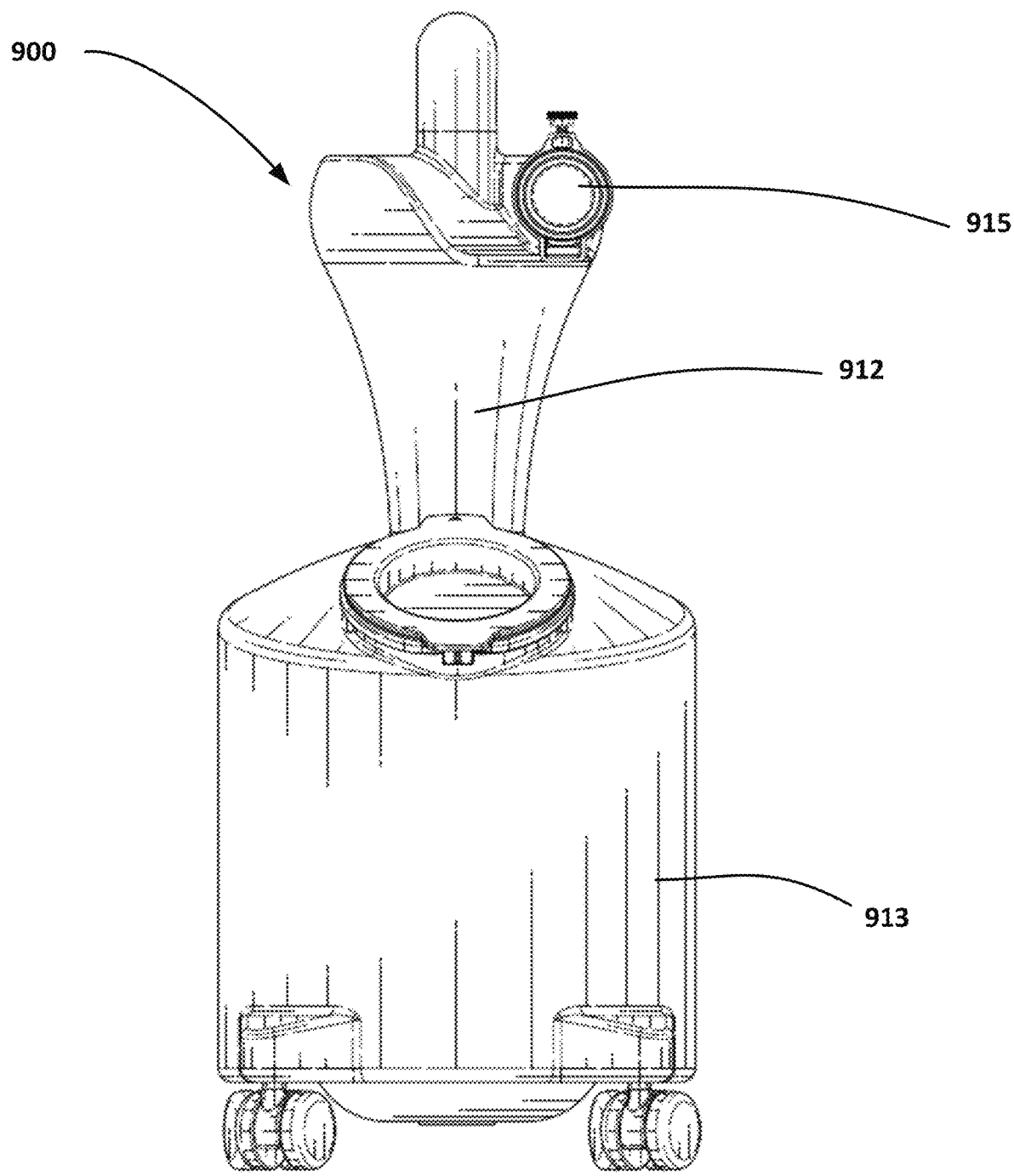
FIG. 12 is a front view of the dust separator shown in FIG. 11.
Figure 13:
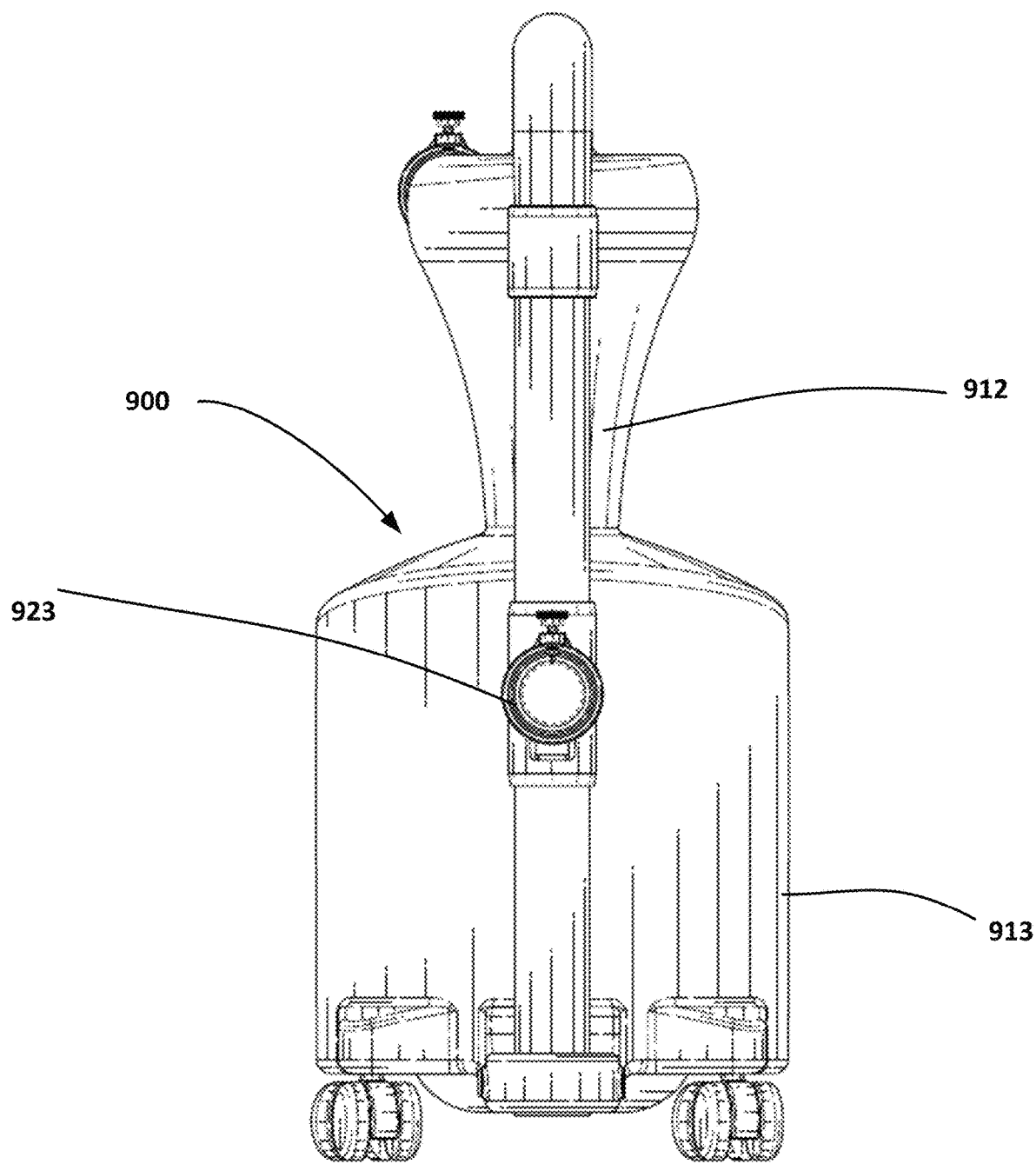
FIG. 13 is a rear view of the dust separator shown in FIG. 11.
Figure 14:
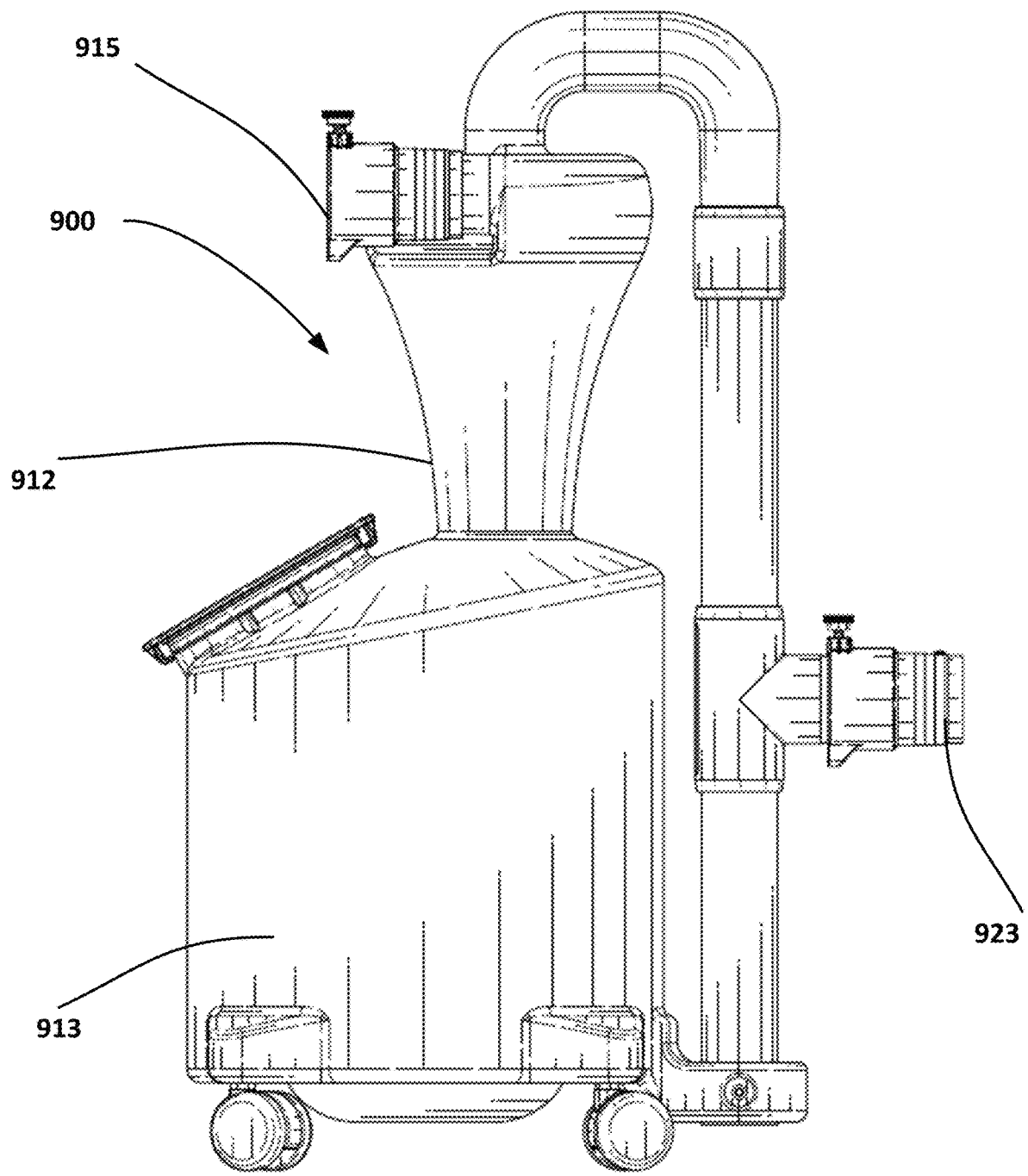
FIG. 14 is a right side view of the dust separator shown in FIG. 11.
Figure 15:
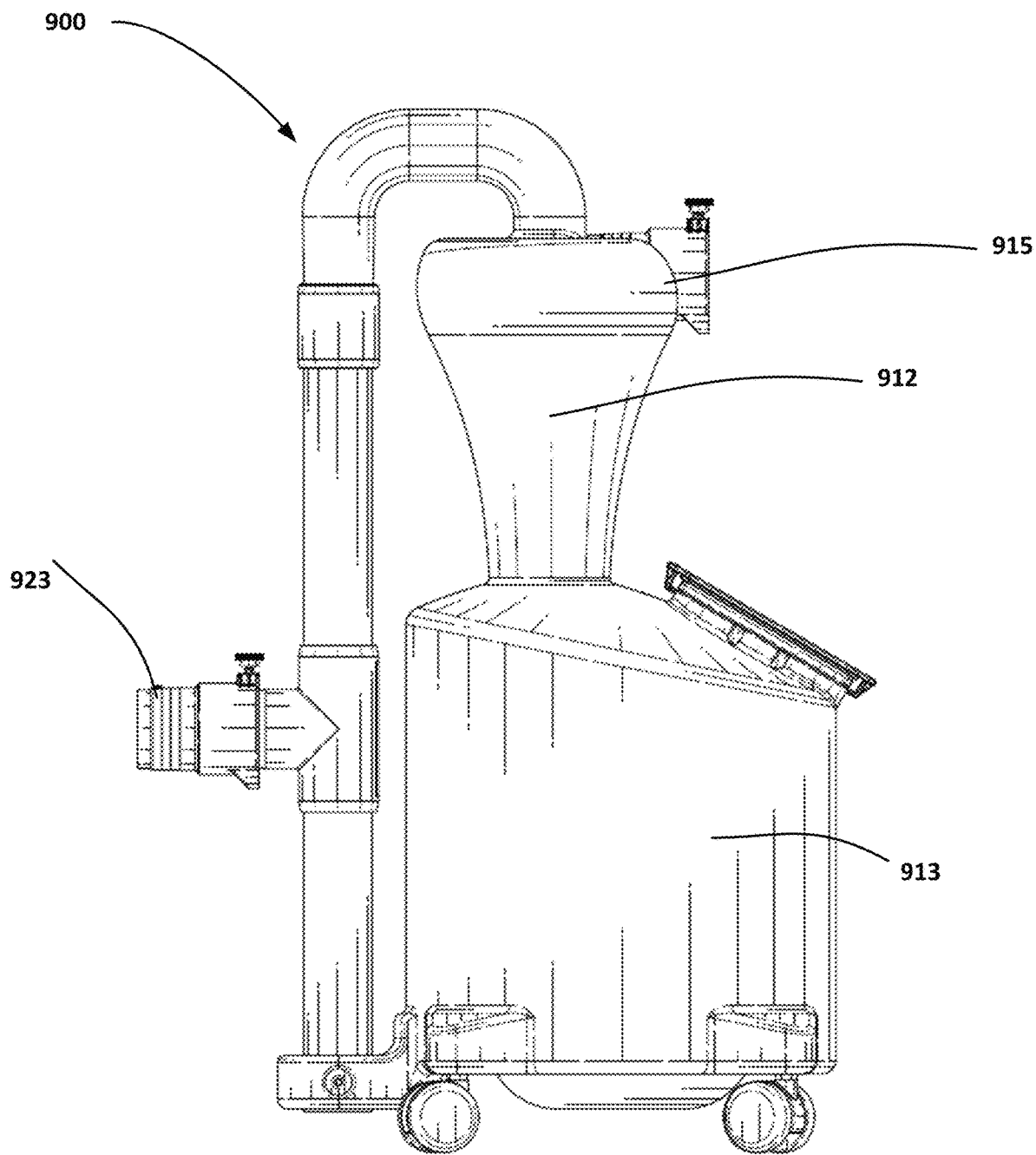
FIG. 15 is a left side view of the dust separator shown in FIG. 11.
Figure 16:
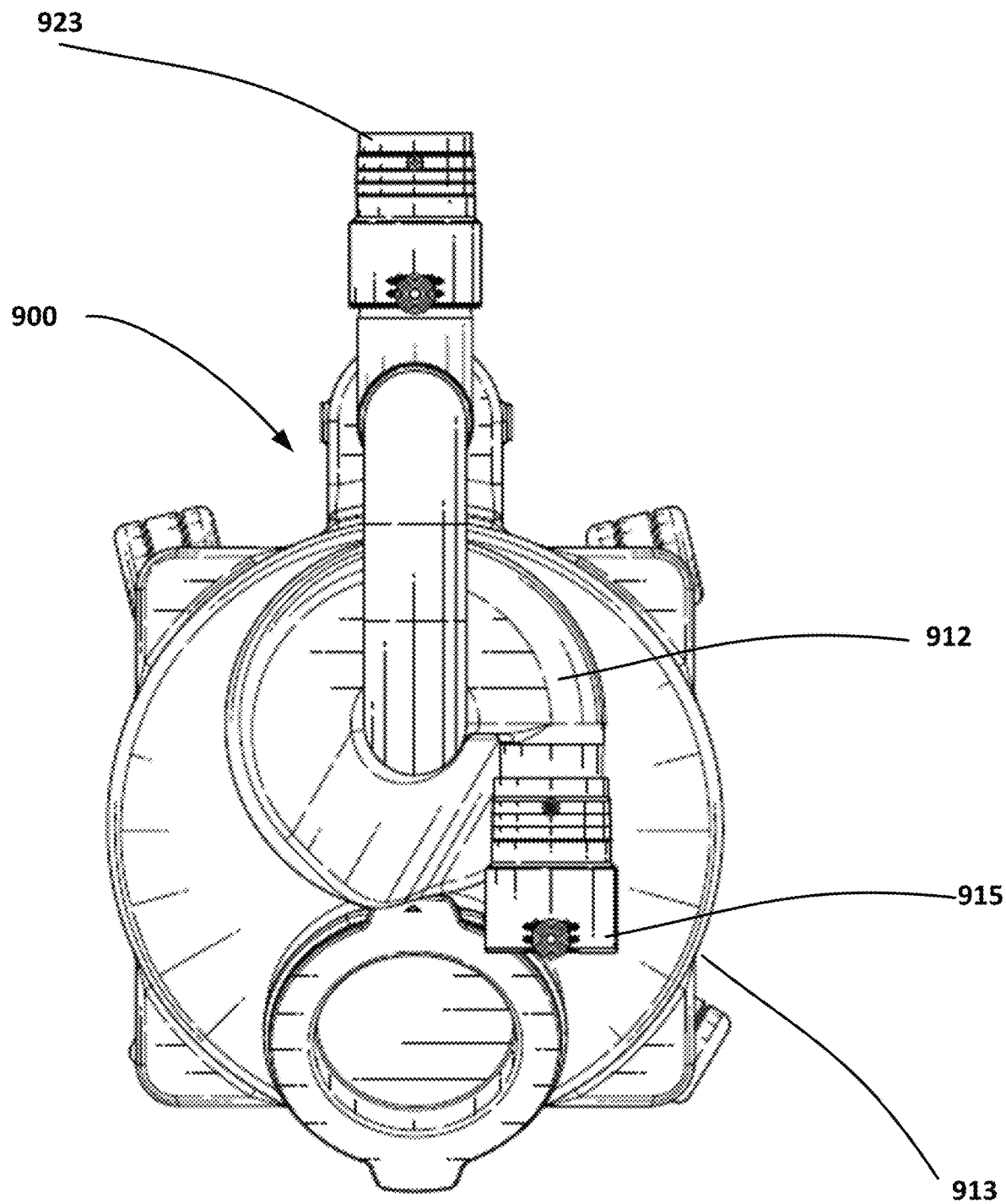
FIG. 16 is a top view of the dust separator shown in FIG. 11.
Figure 17:
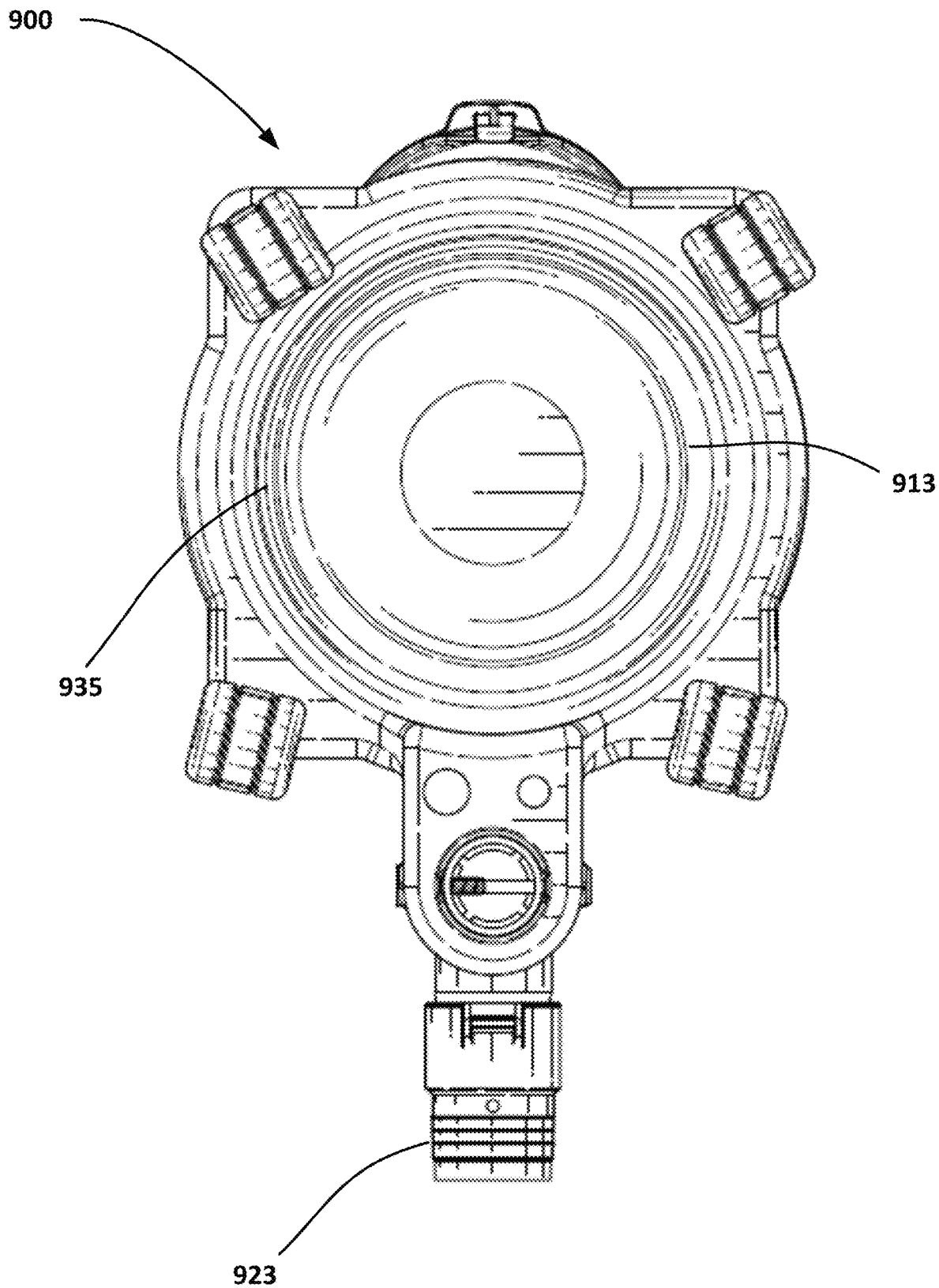
FIG. 17 is a bottom view of the dust separator shown in FIG. 11.
Figure 18:
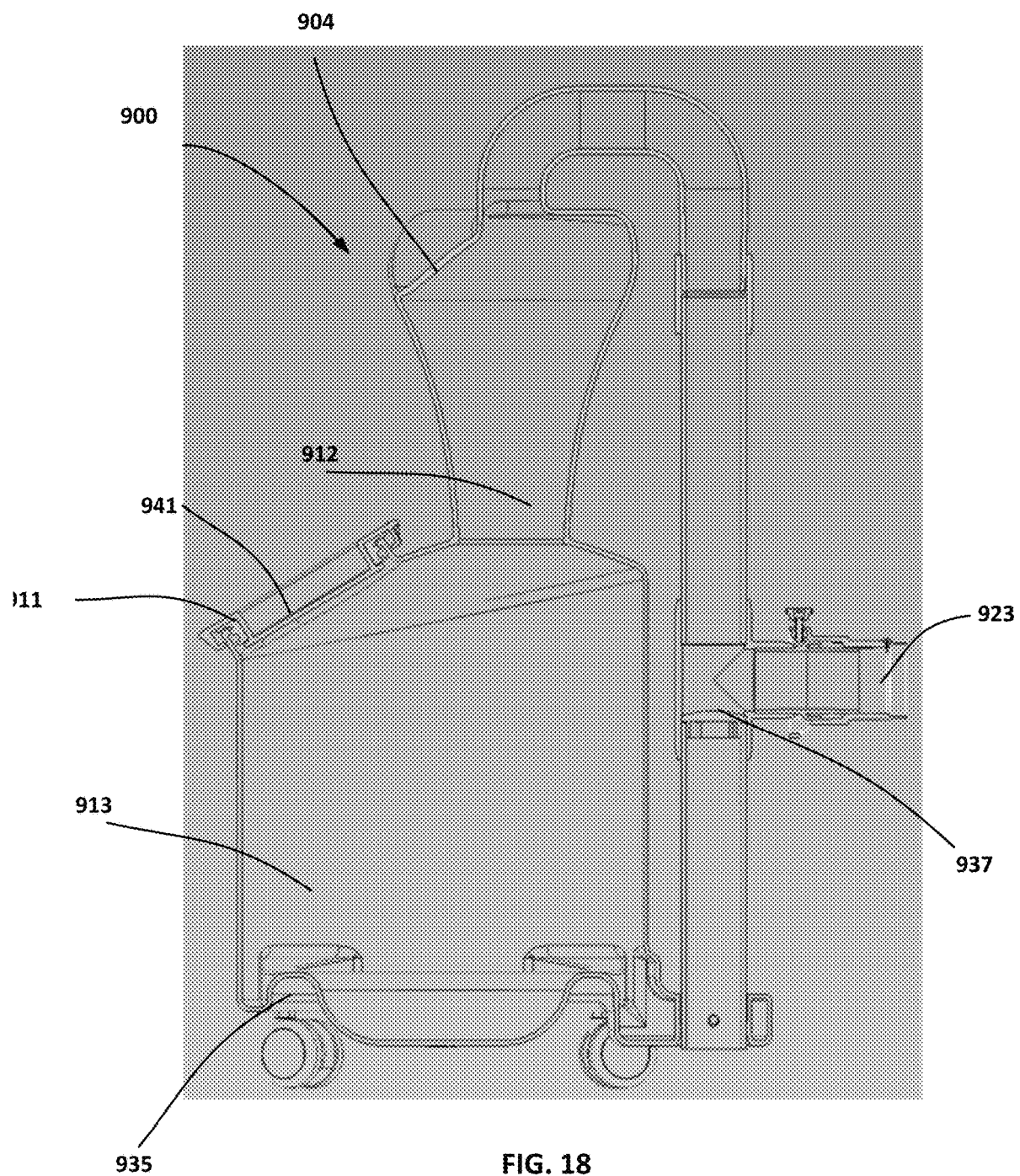
FIG. 18 is a sectional right side view of the dust separator shown in FIG. 11.
Figure 19:
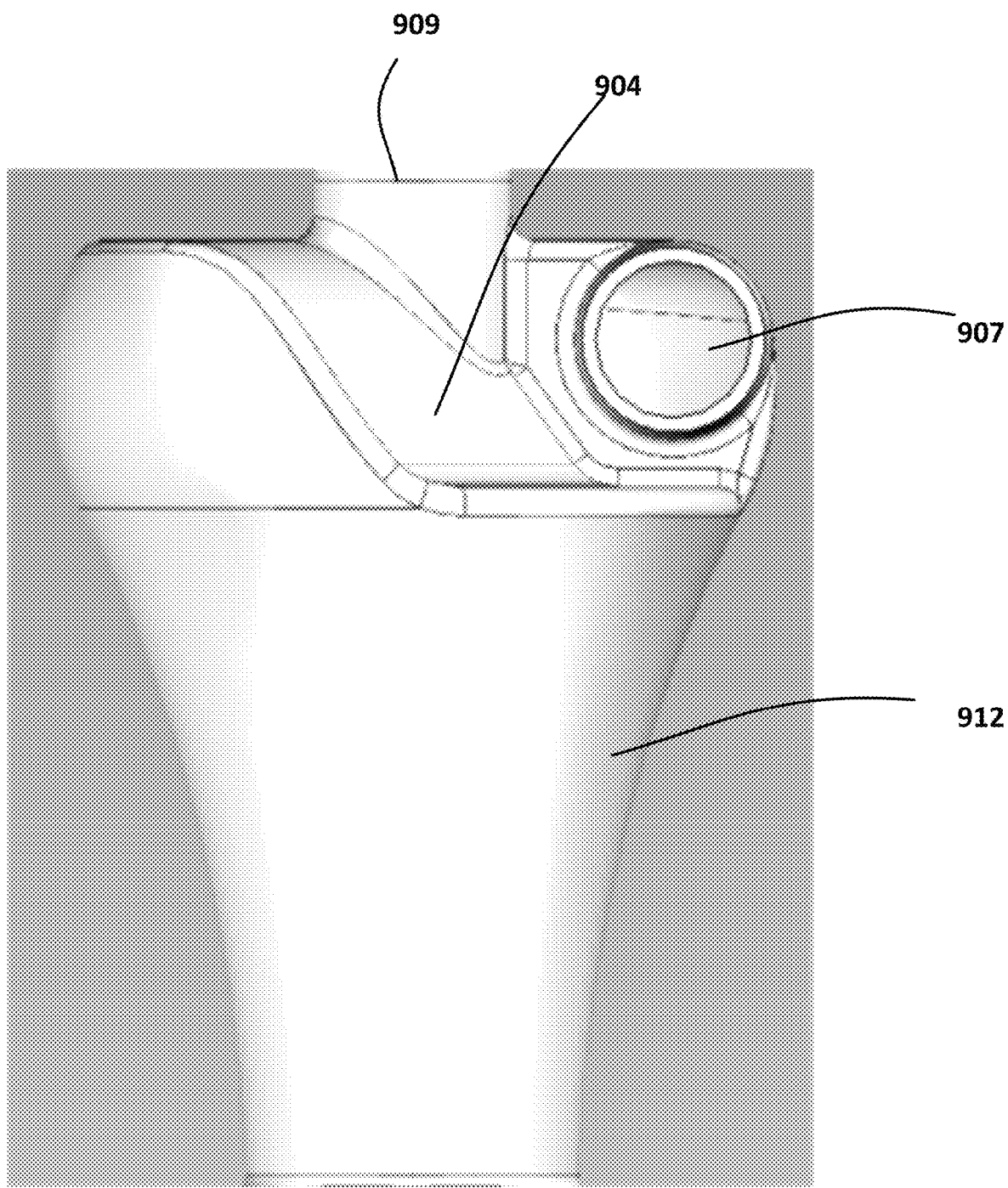
FIG. 19 is a front view of one embodiment of a cyclone chamber.
Figure 20:
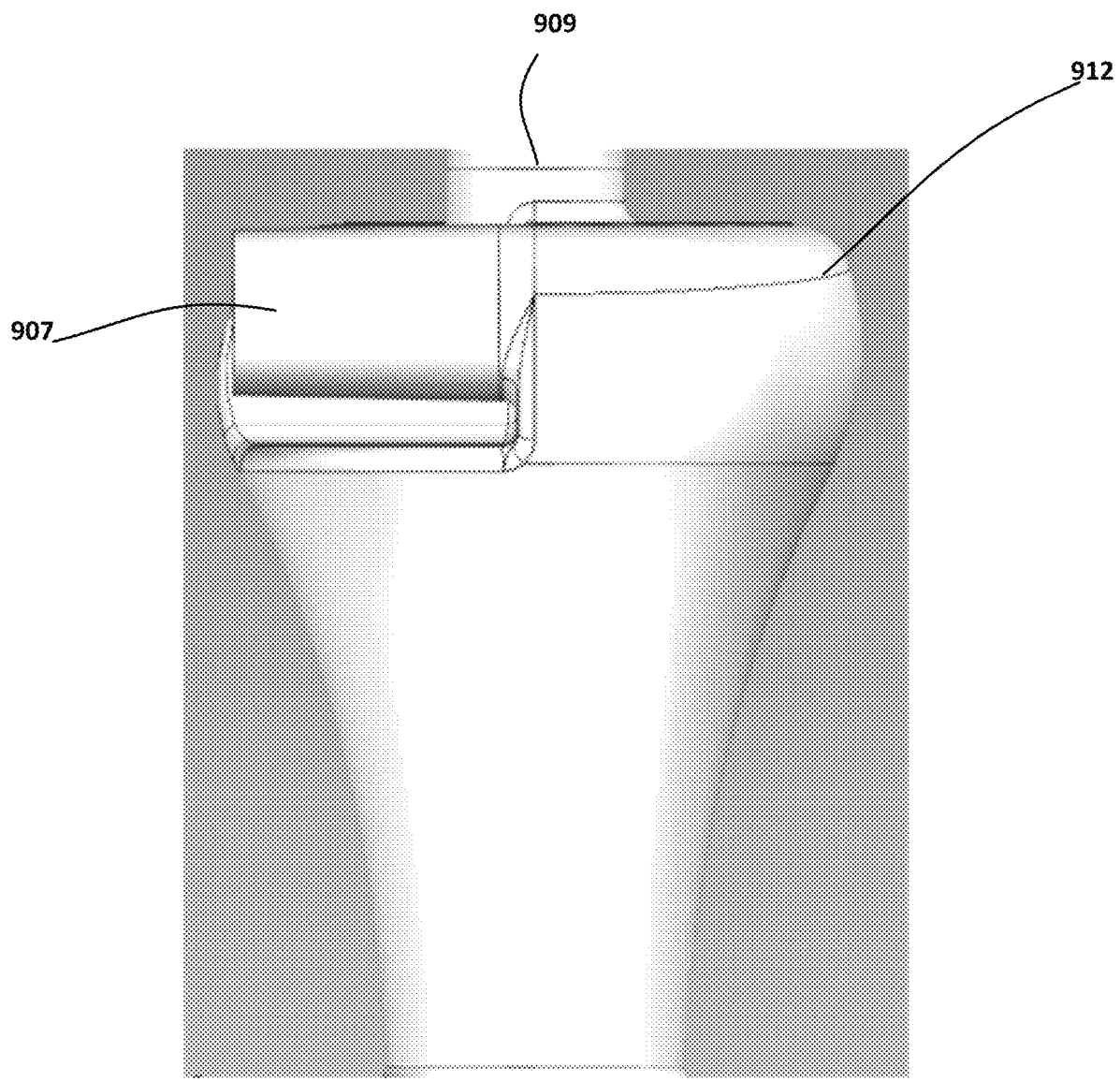
FIG. 20 is a right side view of the cyclone chamber shown in FIG. 19.
Figure 21:
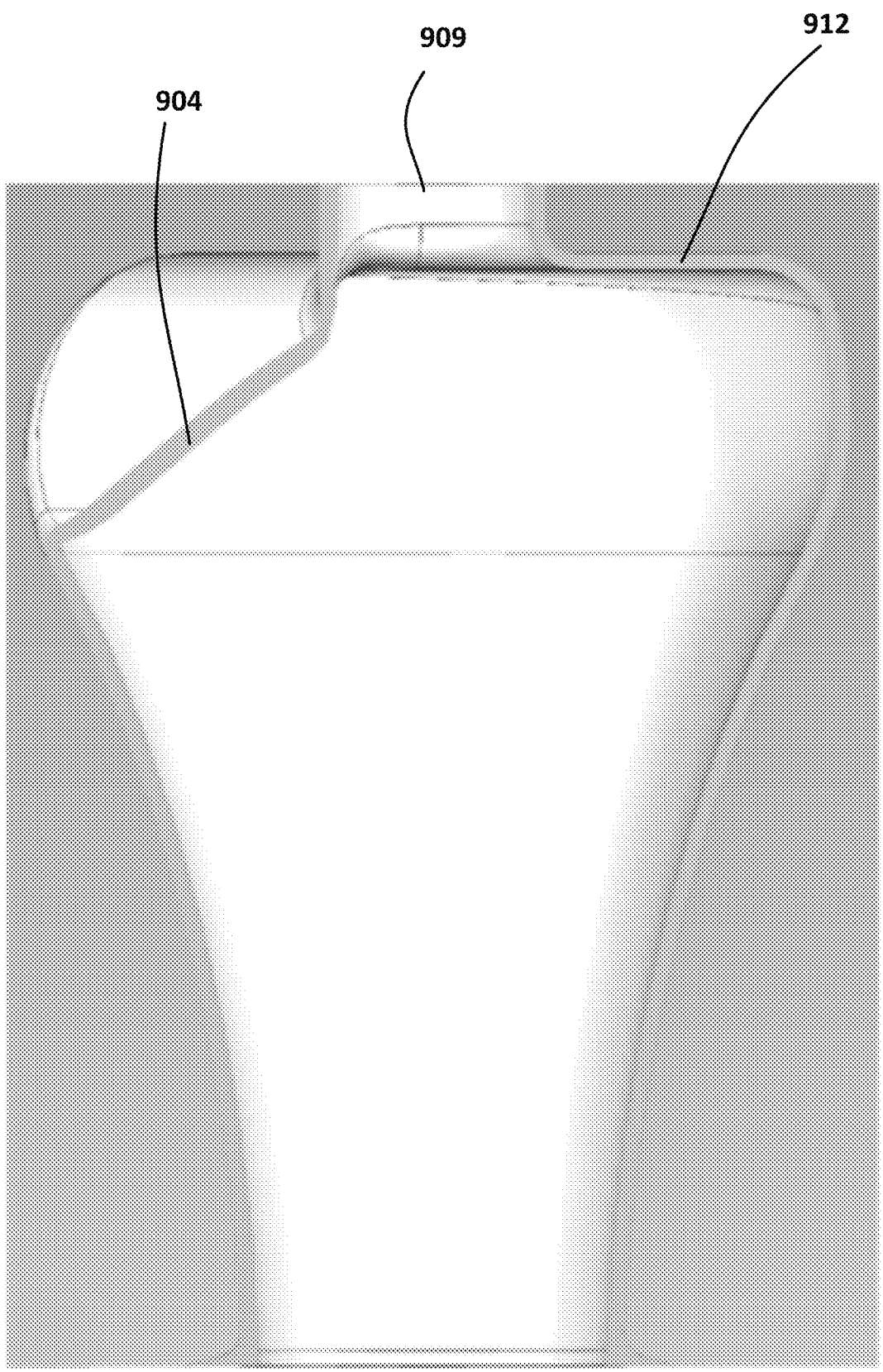
FIG. 21 is a sectional right side view of the cyclone chamber shown in FIG. 19.

The dust separator 900 also includes a dump-port cover 911 that is removably engaged with the dust receptacle 913 and is adapted to seal the dump-port. The dump-port cover 911 can be substantially transparent and in some embodiments contents of the dust receptacle can be observed through dump-port cover 911 when it is engaged with the upper surface 921 of the dust receptacle 913. In some embodiments, the dump-port cover 911 can include a recessed cover 941. The dump-port cover 911 can be threaded onto a threaded lip integrally formed in the top upper surface 911. In other embodiments, the dump-port cover can be attached to the dust receptacle through a friction fit or through mechanical fasteners. As best shown in FIGS. 11 and 18, the dump-port cover 911 may include a recessed cover 941 such that it is substantially in line with the inside of the upper portion 931. This recessed cover 941 may reduce air disruption within the receptacle 913 and provide increased dust separation compared to a non-recessed cover. The dust receptacle also includes a lower portion 933. The lower portion is used for collection of dust particles. As shown in FIGS. 10-18 the lower portion 933 of the dust receptacle 913 is substantially cylindrical. Additionally, as best shown in FIGS. 17 and 18 the dust separator 900 may include an recessed handle 935 which may be an annularly shaped recessed handle. Advantageously the recessed handle 935 can allow a user to more easily grip the dust separator such that the user can dump the contents of the dust separator out of the dump port.

The lower portion 933 of the dust receptacle 913 may also include a tube support 926 which is adapted to prevent or reduce deflection of the tube 920. Advantageously tube 920 may be a piece of standard 1.5-inch diameter PVC pipe (which has an outside diameter of 1.9 inches). The user may adjust the height of the tee connector 922 by adjusting the length of tube 20. This allows the user to easily adjust the height of the tee connector 922 to correspond to the height of the vacuum source 902 and create a rigid connection between the vacuum source 902 and the dust separator 900. Such a rigid connection between the vacuum source 902 and the dust separator 900 is shown in FIG. 10

As described above, the dust separator 900 can be integrally formed as a single piece including at least the cyclone chamber 912, a portion of the cyclone chamber exit path 909, and the dust receptacle 913 can be integrally formed. In such embodiments, the single integrally formed piece can be manufactured by way of an additive manufacturing process. In alternative embodiments, the single piece is manufactured using rotational molding (rotomolding). Rotomolding is a process of heating powder polymers (such as polyethylene or nylon) in a hollow, metal mold as the mold is rotated. As the powder is heated, it melts and forms to the metal mold as the metal mold is rotated and gravity causes the melting powder (or pellets) to be dispersed along interior surfaces of the metal mold, gradually forming an integral plastic part having the form of the metal mold. In still other embodiments the dust separator 900 can be formed through other techniques including, for example, blow molding, injection molding, and other molding techniques. Advantageously the dust separator 900 integrally formed as a single piece can eliminate air leaks that may exist in other dust separation systems which can improve the functionality of the system. For example, While entire dust collection systems have been shown and described above, the cyclone chamber may be used with many other dust collection systems and dust receptacles. As shown in FIGS. 19-22, in some embodiments the cyclone chamber 912 may be formed independently from a dust receptacle. In such embodiments, the cyclone chamber could be attached to any suitable dust receptacle, including for example, a barrel or a bucket.

Figure 22:
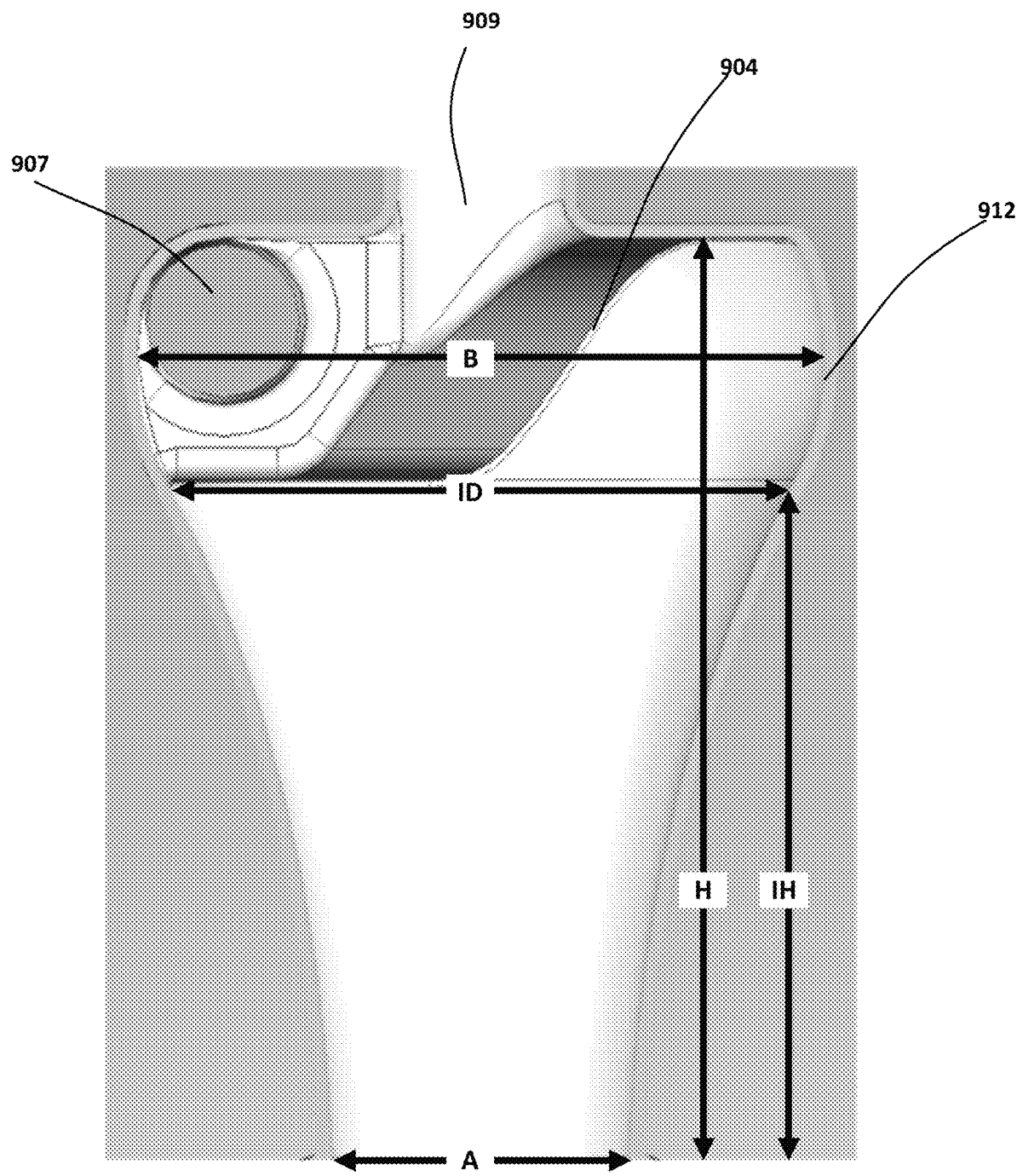
FIG. 22 is a sectional back view of the cyclone chamber shown in FIG. 19.

As described above, the cyclone chamber 912 has a parabolic shape. This cyclone chamber 912 can be described using various measurements and a depiction of some of these measurements are shown in FIG. 22. As shown in FIG. 22, the cyclone chamber 912 can have a height "H" measured from the bottom of the cyclone chamber to the top of the cyclone chamber. The cyclone chamber can have a diameter "A" measured at the bottom of the cyclone chamber. The cyclone chamber can have certain dimensions at the inflection point of the curve. As shown in FIG. 22, the cyclone chamber 912 can have a height "IH" measured from the bottom of the cyclone chamber 912 to the height of the inflection point and the cyclone chamber 912 can have a diameter "ID" measured at the inflection point height. Additionally, the cyclone chamber 912 can have a diameter "B" measured at the widest portion of the cyclone chamber 912. All dimensions described above related to the internal dimensions of the cyclone chamber 912.

Cyclone Chamber Dimensions (FIG. 22):
"A"-diameter of the bottom of the cyclone chamber 912
"H"-height of the cyclone chamber 912
"IH"-height of the inflection point of cyclone chamber 912
"ID"-diameter at the inflection point of cyclone chamber 912
"B"-diameter at the widest portion of cyclone chamber 912

Certain dimensions of the cyclone chamber can be advantageous to the overall functionality of the cyclone chamber 912 and dust collection system. Additionally, as will be understood by one of skill in the art the cyclone chamber 912 may be increased or decreased in size, and thus, certain ratios of dimensions can be advantageous to the overall functionality of the cyclone chamber 912 and dust collection system depending on the size of these components.

As described above, certain dimensions of the different portions of the cyclone chamber can be advantageous to the overall functionality of the cyclone chamber 912. For example, as shown in FIG. 22 the diameter of the of the bottom of the cyclone chamber 912 "B" can be less than the diameter of the inflection point of the cyclone chamber 912 "ID". Similarly, the diameter of the inflection point of the cyclone chamber 912 "ID" can be less than the diameter at the widest portion of cyclone chamber 912 "B". Similarly, the diameter of the upper surface of the cyclone chamber can be less than the diameter of the widest portion of cyclone chamber 912 "B". In some embodiments the diameter of the upper surface of the cyclone can be substantially similar to the diameter at the inflection point of cyclone chamber ("ID") or within about 10% of the diameter at the inflection point of cyclone chamber ("ID").

Additionally, the dimensions discussed herein may be most advantageous for systems associated with standard shop vacuums. Other systems with higher or lower pressure vacuums or suction systems may benefit from use of differently dimensioned portions.

In embodiments, the diameter of the bottom of the cyclone chamber ("A") can be about 3.07 inches; or in the range of about 2.5 inches to about 3.5 inches; or in the range of about 2 inches to about 4 inches. The height of the cyclone chamber ("H") can be about 9.5 inches; or in the range of about 8.5 inches to about 10.5 inches; or in the range of about 7 inches to about 12 inches. The height of the inflection point of the cyclone chamber ("IH") can be about 7 inches; or in the range of about 6 inches to about 8 inches; or in the range of about 5 inches to about 9 inches. The diameter at the inflection point of cyclone chamber ("ID") can be about 6.5 inches; or in the range of about 5.5 inches to about 7.5 inches; or in the range of about 4.5 inches to about 8.5 inches. The diameter at the widest portion of cyclone chamber ("B") can be about 7.11 inches; or in the range of about 6 inches to about 8 inches; or in the range of about 5 inches to about 9 inches. As shown in FIG. 22 a diameter of the upper surface of the cyclone 12 can have a diameter that is less than the diameter at the widest portion of cyclone chamber ("B"). Certain dimensions are shown below in Table 1.

TABLE 1

Relevant Dimensions

| Description | Dimension |
|---|---|
| Diameter of the bottom of the cyclone chamber ("A") | 3.07 inches<br>or in the range of about 2.5 inches to about 3.5 inches<br>or in the range of about 2 inches to about 4 inches |
| Height of the cyclone chamber ("H") | 9.5 inches<br>or in the range of about 8.5 inches to about 10.5 inches<br>or in the range of about 7 inches to about 12 inches |
| Height of the inflection point of cyclone chamber ("IH") | 7 inches<br>or in the range of about 6 inches to about 8 inches<br>or in the range of about 5 inches to about 9 inches |
| Diameter at the inflection point of cyclone chamber ("ID") | 6.5 inches<br>or in the range of about 5.5 inches to about 7.5 inches<br>or in the range of about 4.5 inches to about 8.5 inches |
| Diameter at the widest | 7.11 inches |

TABLE 1-continued

Relevant Dimensions

| Description | Dimension |
|---|---|
| portion of cyclone chamber ("B") | or in the range of about 6 inches to about 8 inches |
| | or in the range of about 5 inches to about 9 inches |

Similarly, as described above, certain ratios of portions of the cyclone chamber 912 can be advantageous to the overall functionality of the cyclone chamber. For example, the ratio of the diameter of the bottom of the cyclone chamber ("A") to the diameter at the widest portion of cyclone chamber ("B") (A:B) can be about 1:2.32; or in the range of about 1:2.1 to about 1:2.5; or in the range of about 1:1.9 to about 1:2.7. The ratio of the diameter at the inflection point of cyclone chamber ("ID") to the height of the inflection point of cyclone chamber ("IH") (ID:IH) can be about 1:1.08; or in the range of about 1:1 to about 1:1.2; or in the range of about 1:0.9 to about 1:1.3. The ratio of height of the inflection point of cyclone chamber ("IH") to the diameter at the widest portion of cyclone chamber ("B") (IH:B) can be about 1:1.02; or in the range of about 1:0.9 to about 1:1.1; or in the range of about 1:0.8 to about 1:1.2. The ratio of height of the inflection point of cyclone chamber ("IH") to the height of the cyclone chamber ("H") (IH:H) can be about 1:1.04; or in the range of about 1:0.9 to about 1:1.1; or in the range of about 1:0.8 to about 1:1.2. The ratio of the diameter at the inflection point of cyclone chamber ("ID") to the diameter at the widest portion of cyclone chamber ("B") (ID:B) can be about 1:1.09; or in the range of about 1:1 to about 1:1.2; or in the range of about 1:0.9 to about 1:1.3. The ratio of diameter of the bottom of the cyclone chamber ("A") to the diameter at the inflection point of cyclone chamber ("ID") (A:ID) can be about 1:2.12; or in the range of about 1:1.9 to about 1:2.3; or in the range of about 1:1.7 to about 1:2.5. The ratio of the diameter of the bottom of the cyclone chamber ("A") to the height of the cyclone chamber ("H") (A:H) can be about 1:3.09; or in the range of about 1:2.8 to about 1:3.4; or in the range of about 1:2.5 to about 1:3.7. The ratio of diameter at the widest portion of cyclone chamber ("B") to Height of the cyclone chamber ("H") (B:H) can be about 1:1.34; or in the range of about 1:1.2 to about 1:1.4; or in the range of about 1:1.1 to about 1:1.5. Certain dimensions are shown below in Table 2.

TABLE 2

Relevant Ratios of Dimensions

| Description | Dimension |
|---|---|
| Ratio of Diameter of the bottom of the cyclone chamber ("A") to Diameter at the widest portion of cyclone chamber ("B") (A:B) | 1:2.32 or in the range of about 1:2.1 to about 1:2.5 or in the range of about 1:1.9 to about 1:2.7 |
| Ratio of Diameter at the inflection point of cyclone chamber ("ID") to Height of the inflection point of cyclone chamber ("IH") (ID:IH) | 1:1.08 or in the range of about 1:1 to about 1:1.2 or in the range of about 1:0.9 to about 1:1.3 |
| Ratio of Height of the inflection point of cyclone chamber ("IH") to Diameter at the widest portion of cyclone chamber ("B") (IH:B) | 1:1.02 or in the range of about 1:0.9 to about 1:1.1 or in the range of about 1:0.8 to about 1:1.2 |
| Ratio of Height of the inflection point of cyclone chamber ("IH") to Height of the cyclone chamber ("H") (IH:H) | 1:1.04 or in the range of about 1:0.9 to about 1:1.1 or in the range of about 1:0.8 to about 1:1.2 |
| Ratio of Diameter at the inflection point of cyclone chamber ("ID") to Diameter at the widest portion of cyclone chamber ("B") (ID:B) | 1:1.09 or in the range of about 1:1 to about 1:1.2 or in the range of about 1:0.9 to about 1:1.3 |
| Ratio of Diameter of the bottom of the cyclone chamber ("A") to Diameter at the inflection point of cyclone chamber ("ID") (A:ID) | 1:2.12 or in the range of about 1:1.9 to about 1:2.3 or in the range of about 1:1.7 to about 1:2.5 |
| Ratio of Diameter of the bottom of the cyclone chamber ("A") to Height of the cyclone chamber ("H") (A:H) | 1:3.09 or in the range of about 1:2.8 to about 1:3.4 or in the range of about 1:2.5 to about 1:3.7 |
| Ratio of Diameter at the widest portion of cyclone chamber ("B") to Height of the cyclone chamber ("H") (B:H) | 1:1.34 or in the range of about 1:1.2 to about 1:1.4 or in the range of about 1:1.1 to about 1:1.5 |

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A dust separator for separating and collecting, from a stream of gas, dust particles suspended in the stream of gas while the stream of gas is in motion towards a vacuum source, the dust separator comprising:
   a vacuum port configured to be connected to the vacuum source;
   a cyclone chamber, the cyclone chamber having an input port and an exit path, wherein the cyclone chamber has a parabolic shape, wherein the cyclone chamber has an upper inner surface having a concave shape, and wherein the cyclone chamber has a lower inner surface having a convex shape;

a tube in communication with the vacuum port and an upper end of the cyclone chamber;

the input port configured to be connected to a dust source, wherein the input port is formed in an upper portion of the cyclone chamber; and a dust receptacle comprising:

an upper portion of the dust receptacle, the upper portion including a top upper surface;

a dump-port in the upper portion of the dust receptacle, the dump-port adapted to empty the dust receptacle of collected dust particles; and a lower portion of the dust receptacle configured for collection of dust particles, the lower portion of the dust receptacle is cylindrical, and wherein the top upper surface slants downward from the cyclone chamber to the dump-port;

wherein the dust separator includes a dump-port cover configured to seal the dump-port formed in the top upper surface of the dust receptacle;

wherein the dust separator includes a tube support configured to prevent deflection of the tube; and a plurality of casters connected to the lower portion of the dust receptacle, wherein the cyclone chamber is located vertically above the dump-port; and wherein at least the cyclone chamber, a portion of the cyclone chamber exit path, and the dust receptacle are integrally formed.

2. The dust separator of claim 1, wherein the tube is rigid.

3. The dust separator of claim 2, wherein the vacuum port comprises a tee connector connected to the rigid tube.

4. The dust separator of claim 1, wherein at least a portion of the dump-port cover is transparent.

5. The dust separator of claim 1, wherein the dump-port cover is threaded onto a threaded lip integrally formed in the top upper surface.

6. The dust separator of claim 5, wherein contents of the dust receptacle can be observed through dump-port cover when it is threaded onto the top upper surface.

7. The dust separator of claim 1, wherein the cyclone chamber, the upper portion of the dust receptacle, and the lower portion of the dust receptacle are integrally formed.

8. A dust separator for separating and collecting, from a stream of gas, dust particles suspended in the stream of gas while the stream of gas is in motion towards a vacuum source, the dust separator comprising:

a vacuum port configured to be connected to the vacuum source;

a cyclone chamber, the cyclone chamber having an input port and an exit path, the input port is formed in an upper portion of the cyclone chamber, wherein the cyclone chamber has an upper inner surface having a concave shape, and wherein the cyclone chamber has a lower inner surface having a convex shape; and a dust receptacle comprising:

an upper portion of the dust receptacle, the upper portion including a top upper surface;

a dump-port in the upper portion of the dust receptacle, the dump-port configured to empty the dust receptacle of collected dust particles; and a lower portion of the dust receptacle configured for collection of dust particles, and wherein the dust separator includes a dump-port cover configured to seal the dump-port formed in the top upper surface of the dust receptacle;

wherein at least a portion of the cyclone chamber is located vertically above the dump-port.

9. The dust separator of claim 8, further comprising a rigid tube in communication with the vacuum port and an upper end of the cyclone chamber.

10. The dust separator of claim 9, wherein the rigid tube comprises standard 1.5 inch diameter PVC pipe.

11. The dust separator of claim 10, wherein the dust separator includes a tube support configured to prevent deflection of the rigid tube.

12. The dust separator of claim 11, wherein the vacuum port comprises a tee connector connected to the tube.

13. The dust separator of claim 8, wherein at least a portion of the dump-port cover is transparent.

14. The dust separator of claim 8, wherein at least the cyclone chamber, a portion of the cyclone chamber exit path, and the dust receptacle are integrally formed.

15. The dust separator of claim 8, wherein the cyclone chamber has a parabolic shape.

16. The dust separator of claim 8, wherein the cyclone chamber has a conical shape.

17. The dust separator of claim 8, wherein the lower portion of the dust receptacle is cylindrical.

18. The dust separator of claim 8, wherein the cyclone chamber, the upper portion of the dust receptacle, and the lower portion of the dust receptacle are integrally formed.

* * * * *